US011502992B1

(12) United States Patent
Koponen et al.

(10) Patent No.: US 11,502,992 B1
(45) Date of Patent: Nov. 15, 2022

(54) LOCAL CONTROLLER AND LOCAL AGENT FOR LOCAL API AUTHORIZATION

(71) Applicant: Styra, Inc., Redwood City, CA (US)

(72) Inventors: Teemu Koponen, San Francisco, CA (US); Timothy L. Hinrichs, Los Altos, CA (US); Torin Sandall, San Francisco, CA (US); Stan Lagun, San Jose, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

(21) Appl. No.: 16/889,770

(22) Filed: Jun. 1, 2020

Related U.S. Application Data

(60) Provisional application No. 62/966,502, filed on Jan. 27, 2020.

(51) Int. Cl.
*H04L 9/40* (2022.01)
*H04L 41/0893* (2022.01)
(Continued)

(52) U.S. Cl.
CPC .............. *H04L 63/02* (2013.01); *G06F 9/547* (2013.01); *G06F 21/629* (2013.01);
(Continued)

(58) Field of Classification Search
CPC ... H04L 63/0236; H04L 63/101; H04L 63/02; H04L 29/06557; H04L 43/045;
(Continued)

(56) References Cited

U.S. PATENT DOCUMENTS 5,974,549 A 10/1999 Golan
6,985,953 B1 1/2006 Sandhu et al.
(Continued)

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.
(Continued)

*Primary Examiner* — Kyung H Shin
(74) *Attorney, Agent, or Firm* — Adeli LLP

(57) ABSTRACT

Some embodiments provide a local controller on a set of host computers that reduce the volume of data that is communicated between the server set and the set of host computers. The local controller executing on a particular host computer, in some embodiments, receives a portion of the namespace including only the policies (e.g., opcode) that are relevant to API-authorization processing for the applications executing on the particular host computer provided by a local agent executing on the computer to authorize the API requests based on policies and parameters. The local controller analyzes the received policies (e.g., policy opcodes) and identifies the parameters (e.g. operands), or parameter types, needed for API-authorization processing (e.g., evaluating the policy opcode upon receiving a particular API request) by the local agent. In some embodiments, the local controller performs this analysis for each updated set of policies (e.g., policy opcodes).

20 Claims, 8 Drawing Sheets

(51) Int. Cl.
*G06F 9/54* (2006.01)
*G06F 21/62* (2013.01)
*H04L 67/133* (2022.01)
*H04L 67/562* (2022.01)

(52) U.S. Cl.
CPC ...... *H04L 41/0893* (2013.01); *H04L 63/0236* (2013.01); *H04L 67/133* (2022.05); *H04L 67/562* (2022.05); *G06F 21/6218* (2013.01); *H04L 63/10* (2013.01); *H04L 63/20* (2013.01)

(58) Field of Classification Search
CPC . H04L 43/062; H04L 63/108; H04L 63/0853; H04L 9/3234; H04L 9/3247; H04L 9/3271; H04L 63/10; H04L 63/107; H04L 63/20; H04L 63/0227; G06F 9/547; G06F 21/629; G06F 21/72; G06F 21/602; G06F 21/52; G06F 21/55; G06F 21/554; G06F 21/6218
See application file for complete search history.

(56) References Cited

U.S. PATENT DOCUMENTS

| | | | |
|---|---|---|---|
| 7,124,192 | B2 | 10/2006 | High, Jr. et al. |
| 7,752,661 | B2 | 7/2010 | Hemsath et al. |
| 8,266,694 | B1 | 9/2012 | Roy |
| 8,613,070 | B1 | 12/2013 | Borzycki et al. |
| 8,683,560 | B1 | 3/2014 | Brooker et al. |
| 8,789,138 | B2 | 7/2014 | Reierson et al. |
| 9,397,990 | B1 | 7/2016 | Taly et al. |
| 9,530,020 | B2 | 12/2016 | Brandwine et al. |
| 9,648,040 | B1 * | 5/2017 | Morkel ............... H04L 63/10 |
| 10,122,757 | B1 | 11/2018 | Kruse et al. |
| 10,127,393 | B2 | 11/2018 | Ferraiolo et al. |
| 10,257,184 | B1 | 4/2019 | Mehta et al. |
| 10,353,726 | B2 | 7/2019 | Duan |
| 10,454,975 | B1 | 10/2019 | Mehr |
| 10,469,314 | B2 | 11/2019 | Ennis, Jr. et al. |
| 10,592,302 | B1 | 3/2020 | Hinrichs et al. |
| 10,715,514 | B1 | 7/2020 | Threlkeld |
| 10,719,373 | B1 | 7/2020 | Koponen et al. |
| 10,789,220 | B2 | 9/2020 | Mayer et al. |
| 10,984,133 | B1 | 4/2021 | Hinrichs et al. |
| 10,986,131 | B1 | 4/2021 | Kruse et al. |
| 10,990,702 | B1 | 4/2021 | Hinrichs et al. |
| 11,023,292 | B1 | 6/2021 | Hinrichs et al. |
| 11,080,410 | B1 | 8/2021 | Sandall et al. |
| 11,108,827 | B2 | 8/2021 | Beckman et al. |
| 11,108,828 | B1 | 8/2021 | Curtis et al. |
| 11,170,099 | B1 | 11/2021 | Sandall et al. |
| 11,245,728 | B1 | 2/2022 | Curtis et al. |
| 11,258,824 | B1 | 2/2022 | Hinrichs et al. |
| 11,327,815 | B1 | 5/2022 | Koponen et al. |
| 2007/0156670 | A1 | 7/2007 | Lim |
| 2009/0063665 | A1 | 3/2009 | Bagepalli et al. |
| 2009/0077618 | A1 | 3/2009 | Pearce et al. |
| 2010/0333079 | A1 | 12/2010 | Sverdlov et al. |
| 2011/0113484 | A1 | 5/2011 | Zeuthen |
| 2012/0030354 | A1 | 2/2012 | Razzaq et al. |
| 2012/0311672 | A1 | 12/2012 | Connor et al. |
| 2012/0331539 | A1 | 12/2012 | Matsugashita |
| 2013/0226970 | A1 | 8/2013 | Weber et al. |
| 2014/0032691 | A1 | 1/2014 | Barton et al. |
| 2014/0032759 | A1 | 1/2014 | Barton et al. |
| 2014/0033267 | A1 | 1/2014 | Aciicmez |
| 2014/0237594 | A1 * | 8/2014 | Thakadu ............... G06F 21/52 726/23 |
| 2015/0089575 | A1 | 3/2015 | Vepa et al. |
| 2016/0057107 | A1 * | 2/2016 | Call ..................... H04L 63/0236 726/11 |
| 2017/0161120 | A1 | 6/2017 | Sasaki et al. |
| 2017/0220370 | A1 | 8/2017 | Klompje et al. |
| 2017/0237729 | A1 | 8/2017 | Uppalapati |
| 2017/0346807 | A1 | 11/2017 | Blasi |
| 2018/0067790 | A1 | 3/2018 | Chheda et al. |
| 2018/0082053 | A1 | 3/2018 | Brown et al. |
| 2018/0109538 | A1 | 4/2018 | Kumar et al. |
| 2018/0309746 | A1 | 10/2018 | Blasi |
| 2018/0367311 | A1 * | 12/2018 | Stahlberg ............. H04L 9/3234 |
| 2019/0007418 | A1 | 1/2019 | Cook et al. |
| 2019/0007443 | A1 | 1/2019 | Cook et al. |
| 2019/0230130 | A1 | 7/2019 | Beckman et al. |
| 2019/0245862 | A1 | 8/2019 | Kruse et al. |
| 2019/0386973 | A1 | 12/2019 | Patwardhan et al. |
| 2020/0007580 | A1 | 1/2020 | Liderman et al. |
| 2021/0029029 | A1 | 1/2021 | Mehmedagic et al. |
| 2021/0240550 | A1 | 8/2021 | Hinrichs et al. |
| 2021/0248017 | A1 | 8/2021 | Hinrichs et al. |
| 2021/0365571 | A1 | 11/2021 | Sandall et al. |

OTHER PUBLICATIONS

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, IEEE, London, UK.

Mon-Published commonly Owned U.S. Appl. No. 16/050,119, filed Jul. 31, 2018, 55 pages, Styra, Inc.

Mon-Published commonly Owned U.S. Appl. No. 16/050,123, filed Jul. 31, 2018, 56 pages, Styra, Inc.

Mon-Published commonly Owned U.S. Appl. No. 16/050,143, filed Jul. 31, 2018, 56 pages, Styra, Inc.

Mon-Published commonly Owned Related U.S. Appl. No. 16/889,761 with similar specification, filed Jun. 1, 2020, 56 pages, Styra, Inc.

* cited by examiner

610

```
enforce[decision] {
    data.library.v1.kubernetes.admission.network.v1.ingress_host_conflict[message]
    decision := {
        "allowed": false,
        "message": message
    }
}
```

612

615

```
ingress_host_conflict[reason] {
    input.request.kind.kind == "Ingress"

# find existing ingress not identical to 'input'
    existing := data.kubernetes.resources.ingresses[ns][name]
    [name, ns] != [input.request.object.metadata.name, input.request.object.metadata.namespace]

# find rule in 'input' and rule in 'existing' with the same host
    host := input.request.object.spec.rules[_].host
    host == existing.spec.rules[_].host
    reason := sprintf("%v host %v conflicts with ingress %v/%v).", [utils.input_id, host, ns, name])
}
```

LOCAL CONTROLLER AND LOCAL AGENT FOR LOCAL API AUTHORIZATION

BACKGROUND

Most applications today use access control rules to allow different users with different privileges, different access to the applications and their resources. Typically, the access controls are coded within an application's code base, which makes it very difficult to modify these controls statically, and impossible to modify them dynamically while the application is running. This problem is especially acute for microservice applications, which are often small, well-defined applications that perform a small set of operations. Incorporating complex access controls in these applications is not practical as such controls would burden these applications with unnecessary functional complexity that not only runs counter to the focus of these micro-service applications, but would also be difficult to maintain and update. Accordingly, most micro-service applications employ no access controls or the most rudimentary access controls.

BRIEF SUMMARY

Some embodiments of the invention provide a local controller in a system for defining, distributing and enforcing policies for authorizing API (Application Programming Interface) calls to applications executing on one or more sets of associated machines (e.g., virtual machines, containers, computers, etc.) in one or more datacenters. This system has a set of one or more servers that acts as a logically centralized resource for defining, storing, and distributing policies and parameters for evaluating these policies.

The server set in some embodiments receives and stores definitions of several authorization policies for several API calls to one or more applications executing on a set of associated machines. In some embodiments, the server set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments receives parameters for evaluating the policies. For one or more sources (e.g., LDAP directories, etc.) in the datacenter(s), the server set in some embodiments has one or more data-source adapters that collect parameters from these data sources and store these parameters in order to evaluate the authorization policies to assess whether API calls should be authorized. The server set also allows such parameters to be entered through a web-based user interface.

For each set of related machines (e.g., for each tenant in a multi-tenant datacenter), the server set in some embodiments stores the defined authorization policies, and collected parameters needed to resolve these policies, in a single hierarchical storage structure that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy, or stores one or more other location-identifiers that identify one or more other locations in the hierarchical storage structure at which the set of collected parameters was previously stored in the structure. For each set of related machines (e.g., for each tenant in a multi-tenant datacenter, for each division of a multi-division company, for each department of a school, etc.), the hierarchical storage structure in some embodiments is a namespace that stores the policies, and the parameters for resolving these policies, for the set of related machines.

In some embodiments, the single storage structure (e.g., the namespace) stores the policy for authorizing each API call as one or more lines of opcode (i.e., as one or more opcode expressions/statements). Each such policy is referred to as policy opcode in the discussion below. Also, policy operands in the discussion below refer to the parameters that are needed to resolve the policy opcodes for the API calls. The single storage structure in some embodiments stores such policy operands along with the policy opcodes. The policy opcodes in some embodiments are written in a declarative language. Also, in some embodiments, the policy operands are written in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively or conjunctively, in some embodiments, the policy operands are expressed in other formats, e.g., binary format, etc.

The server set in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the server set identifies an operand update by retrieving the update from a source of the operand (i.e., the parameter set) through a data pull operation and/or by receiving the update from the source through a data push operation.

The server set in some embodiments updates the policy operands dynamically in real time. Accordingly, in some embodiments, the server set collects and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the server set in each deployment. This is because the server set not only allows custom policies to be defined for each deployment, but also allows these policies to be resolved based on conditions and dynamic parameters that are specific to each deployment.

In some embodiments, the server set is not only a logically-centralized resource for defining and storing policies and parameters, but is also a logically-centralized resource for distributing, through a set of local controllers executing on hosts of the system, the defined policies to policy-enforcing local agents that execute near applications that are to process the API calls (e.g., to local agents that execute on the same host computers as the API-processing applications, on the same VM/container as the API-processing applications, etc.). In some of the embodiments that store the policies and parameters in a namespace, the server set distributes different portions of the namespace to different host computers based on the policies that are relevant to the API-authorization processing for the applications executing on the different host computers. The different portions that are distributed to the different host computers can be overlapping in some embodiments.

For instance, to a first computer, the server set distributes a first portion of the namespace that comprises policies and parameter sets relevant for processing API calls to a set of applications executing on the first computer, while distributing a second portion of the namespace that comprises policies and parameter sets relevant for processing API calls to a set of applications executing on the second computer, with the first and second namespace portions differing in that at least one policy and at least one parameter set of the first portion is not in the second portion. These two namespaces can have no policies or parameters in common, or they can have one or more policies and parameters in common.

In some embodiments, the server set uses a push model to distribute the policies/parameters (e.g., the relevant namespace portions) to each local agent. In other embodiments, the server set uses a pull model to distribute the policies/parameters. For instance, in these embodiments, once a local agent initializes, it queries the server set for policies and parameters relevant to it. In these embodiments, the local agent also periodically polls the server set to determine whether policies or parameters that the local agent previously received have been updated on the server set, and thereby need to be copied on the local agent's portion of the namespace. When such updates exist, the local agent retrieves them from the server set or receives them as part of its querying poll.

Some embodiments provide a local controller on a set of host computers that reduce the volume of data that is communicated between the server set and the set of host computers. The local controller executing on a particular host computer, in some embodiments, receives a portion of the namespace including only the policies (e.g., opcode) that are relevant to the API-authorization processing for the applications executing on the particular host computer. The local controller analyzes the received policies (e.g., policy opcodes) and identifies the resources, and related parameters (e.g., parameter values or operands), needed for API-authorization processing (e.g., evaluating the policy opcode upon receiving a particular API request) by the local agent. In some embodiments, the local controller performs this analysis for each updated set of policies (e.g., policy opcodes).

Based on the parameters identified as being required for the API-authorization processing, the local controller requests the parameter values for the identified parameters from a local data source. In some embodiments, the local source is a network controller that maintains a single storage structure (e.g., namespace) storing parameter values (e.g., policy operands) for resources of the network. In some embodiments, the policy operands are stored in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively, or conjunctively, in some embodiments, the policy operands are expressed in other formats, e.g., binary format, etc. In some embodiments, the request is a set of calls to an API exposed by the network controller for parameter values relating to a corresponding set of resources (or parameters) necessary for API-authorization processing by the local agent. The request, in some embodiments, initiates a connection over which updates to the parameter values relating to the set of resources are sent to the local controller (e.g., in a push, or long-pull operation).

The local controller then receives the requested parameter values from the local data source. Once the required parameters are received by the local controller, the local controller provides the operands to the local agent for API-authorization processing. In some embodiments, the local controller provides only relevant data to the local agent, while in other embodiments, the set (or sets) of data provided by the local data source are provided in their entirety to the local agent. Similarly, as the local controller receives updates to the required parameters from the local data source (e.g., as a result of initiating the long-pull operation), the local controller provides the parameters to the local agent. In different embodiments, the local controller provides (1) the entire update from the local data source, (2) the relevant portion of the update from the local data source, (3) only the updated information from the local data source, and (4) only the updated relevant data from the local data source. In some embodiments, the local controllers also provide updated parameters to the server set to update the parameters stored by the server set.

After receiving the policy and parameter sets (e.g., a namespace including the policy opcode received from the server set and the parameters retrieved by the local controller), the local agent for an application receives requests to determine whether API calls received by the application are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container).

In other embodiments, the authorization module sends its API-authorization requests to the local agent through other mechanisms (such as other IPC (inter-process communication) messages) that initiate above the network stack. Also, in some embodiments, the API-authorization request does not come to the local agent from the application to which the API call is directed. For instance, in some embodiments, a first application intercepts an API call intended for a second application, and sends a request (e.g., through RPC, IPC, etc.) to authorize this API call to the local agent. When the local agent authorizes this request, the first application then passes the API call to the second application, while discarding this call when the local agent rejects this call.

The received API-authorization request contains a first set of one or more parameters associated with the API call. The first parameter set includes at least one parameter that identifies the API call, its type and/or other metadata about the API call. In some embodiments, at least one parameter in the first parameter set is received by the application in the API call. For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

After receiving the API-authorization request from a particular application, the local agent uses one or more parameters in the first parameter set to retrieve policy opcode related to the API call from the namespace that it received from the server set. For a typical local agent, the agent's namespace is a subset of the global namespace that the server set (and the local controller) maintains for a set of related machines, because the local agent's namespace in some embodiments only contains the policies that are relevant for the API calls that the agent will encounter, as mentioned above.

To evaluate this policy opcode, the agent might also retrieve policy operands, which serves as a second set of parameters associated with the API call. The local agent then uses the first parameter set and/or second parameter set to evaluate the retrieved API-authorization policy opcode in order to determine whether the API call should be approved or rejected. Specifically, the policy opcode includes one or more rules that specify one or more conditions for approving or rejecting the API calls. The agent resolves these conditions based on the first parameter set and/or second parameter set.

For instance, in some embodiments, the agent determines that one or more parameters in the received parameter set and/or retrieved parameter set match a condition specified by the policy opcode (in terms of one or more parameters) for rejecting an API call. In some embodiments, the conditions can specify reasons for allowing an API call. Some API-authorization policies are resolved only by reference to the received parameter sets (i.e., only specify conditions that just need the received parameter sets to be resolved). Other API-authorization policies are resolved only by reference to the retrieved parameter sets (i.e., only specify conditions that just need the retrieved parameter sets to be resolved). Still other API-authorization policies are resolved by reference to both the received and retrieved parameter sets (i.e., specify conditions that need both the received and retrieved parameter sets to be resolved).

Based on this evaluation, the local agent then sends the particular application (e.g., the API authorization module of the particular application) a message (e.g., an RPC reply message) to specify whether the API call should be approved or rejected. When the API call is approved, the particular application then performs the operation associated with the API call, and if necessary, returns an output to the source of the API call (i.e., to the module that sent the API call) to the particular application. On the other hand, when the API call is rejected, the particular application sends the message to the source of the API call to reject the call, or simply discards the call without providing a response.

In some embodiments, the local agents operate in the same failure domain as the machines on which the applications execute. For instance, when an application executes on a virtual machine (VM) or container, the local agent in some embodiments executes on the same VM or container as the application. In other embodiments, the local agent does not execute on the same VM or container as its associated application, but executes on the same host computer as the application's VM or container.

In some embodiments, each local agent is associated with just one application that executes on the same computer, same VM or same container as the local agent. In other embodiments, one local agent in some embodiments can be shared by multiple applications that execute on the same VM, container, or host computer as the agent. However, in a multi-tenant datacenter, some embodiments do not allow local agents to be shared by applications executing on different tenant computers, VMs or containers. Other embodiments, on the other hand, allow one local agent to be used by different applications of different tenants.

Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

As mentioned above, the server set in some embodiments distributes policies and parameters to local agents so that they can evaluate API-authorization requests locally. Conjunctively or alternatively, the server set in some embodiments also processes API-authorization requests from applications executing on a set of associated machines. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations can be gradually rejected, or a limited access to the application can be provided until the API calls are authorized.

Accordingly, in some embodiments, an API-authorization module of an application executing on a computer sends an API-authorization request (e.g., as an RPC message) to a local agent on the same computer, and this local agent forwards this request (e.g., as another RPC message) to the server set. In other embodiments, the API-authorization module of the application sends the API-authorization request (e.g., as an RPC message) directly to the server set.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set then uses one or more parameters in the first parameter set to retrieve a policy opcode related to the API call from the namespace for the set of associated machines to which the application belongs. To evaluate this policy opcode, the server set might also retrieve policy operands from the namespace, which serves as a second set of parameters associated with the API call.

The server set then uses the first parameter set and/or second parameter set to evaluate the retrieved API-authorization policy opcode in order to determine whether the API call should be approved or rejected. For example, in some embodiments, the server set resolves one or more conditions specified in the retrieved policy opcode based on one or more parameters in the first parameter set and/or second parameter set (e.g., determines that one or more parameters in the received parameter set and/or retrieved parameter set matches a parameter-related condition specified by the policy opcode for rejecting an API call). Based on this evaluation, the server set then sends the local agent or the application's authorization module a reply (e.g., a RPC reply message) to specify whether the API call should be approved or rejected. When this response is sent to the local agent, the agent then relays this message (e.g., as an RPC reply message) to the application's API-authorization module.

In some embodiments, the API-authorization modules (on the host computers or on the server set) are used to authorize API calls for both application domain logic (also called core logic or business logic) and application infrastructure logic. In other embodiments, the API-authorization modules (on the host computers or on the server set) are used to authorize API calls for application infrastructure logic but not application domain logic.

Applications typically include application domain logic and application infrastructure logic. Application domain logic captures the domain rules for creating, storing, and manipulating data relating to the core functions of the application. For instance, in banking, domain logic captures the logic to calculate the monthly interests for bank accounts, prepare and calculate a mortgage offer (involving complex formulas using credit scores and other information available), or simply move funds between two accounts. In banking, domain logic would also be responsible for preparing the web page contents as customers access their bank accounts over the web.

Application infrastructure logic provides support functions that allow the application domain logic to run, and to run reliably and scalably. Examples of such support functions include integration functions with other applications (various protocol implementations), configuration management (logic might have configuration options), monitor and alert functions (to detect when the domain logic is down), schedule and thread management facilities (to run several logic instances is parallel for improved scalability), etc. While these functions are critical, they are not typically a concern of the application domain logic. Hence, decoupling API authorization for infrastructure logic simplifies the application code and allows the application's code to focus on matters relevant to the application's core functions.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 6 illustrates a sample authorization policy opcode that is received from a remote server set by the local controller.

DETAILED DESCRIPTION

Figure 1:
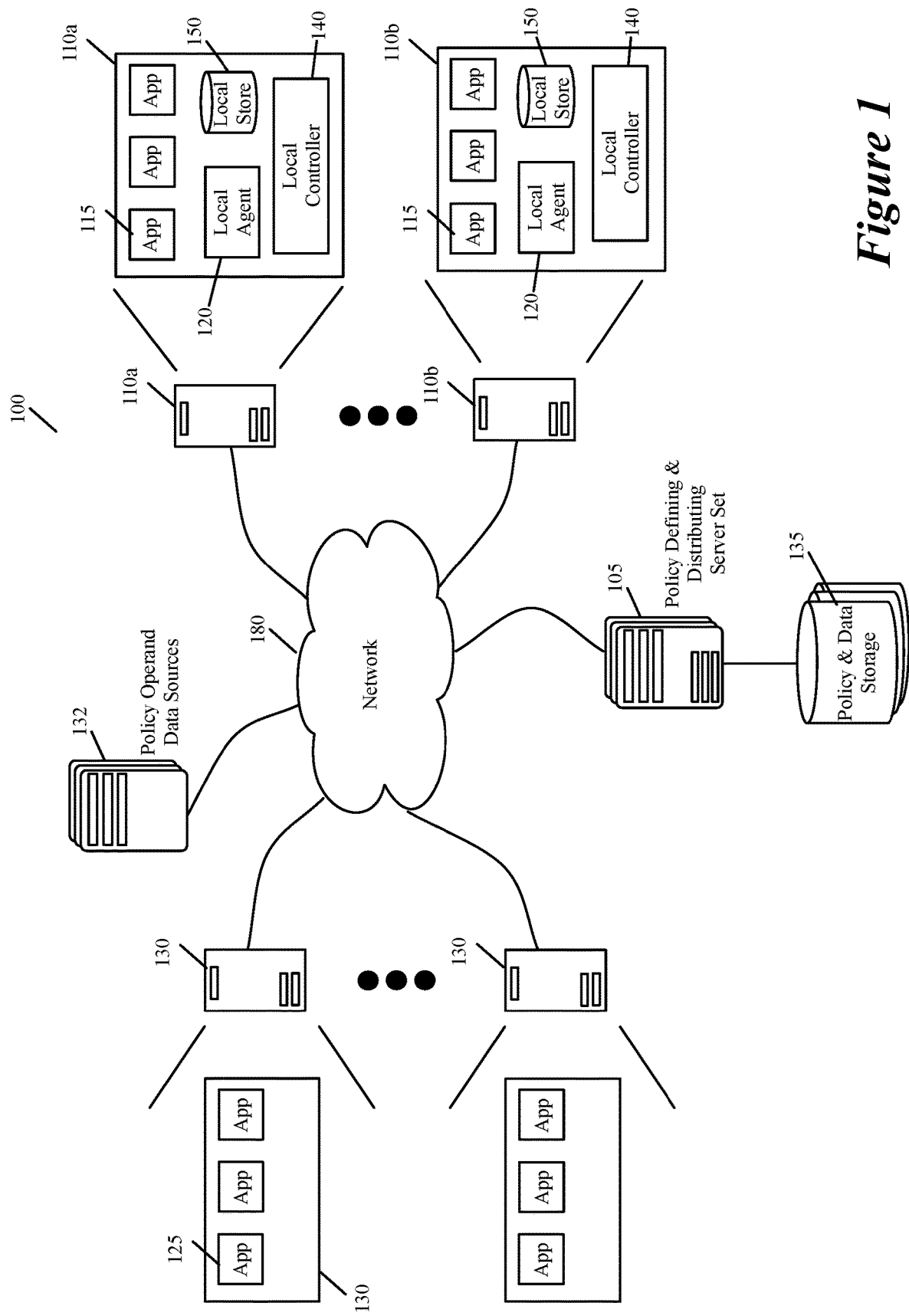
FIG. 1 illustrates a policy enforcement system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a local controller in a system for defining, distributing and enforcing policies for authorizing API (Application Programming Interface) calls to applications executing on one or more sets of associated machines (e.g., virtual machines, containers, computers, etc.) in one or more datacenters. This system has a set of one or more servers that acts as a logically centralized resource for defining, storing, and distributing policies and parameters for evaluating these policies.

The server set in some embodiments receives and stores definitions of several authorization policies for several API calls to one or more applications executing on a set of associated machines. In some embodiments, the server set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set in some embodiments collects and stores parameters for evaluating the authorization policies to assess whether API calls should be authorized. For one or more sources (e.g., LDAP directories, etc.) in the datacenter(s), the server set in some embodiments has one or more data-source adapters that collect parameters from these data sources and store these parameters in order to evaluate the authorization policies to assess whether API calls should be authorized. The server set also allows such parameters to be entered through a web-based user interface.

The collected parameters in some embodiments are specific to each set of related machines (e.g., for each tenant in a multi-tenant datacenter or each department or division of a multi-department or multi-division entity) for which the server set defines and distributes policies. The server set in some embodiments updates these parameters dynamically in real time. Accordingly, in some embodiments, the server set uses, collects, and updates parameters for resolving policies dynamically and in a deployment specific manner (i.e., in a manner that can be context specific for each set of associated machines for which the server set is deployed). The dynamic and deployment-specific way that the server set collects and updates policy-resolving parameters greatly enhances the configurability of the server set in each deployment. This is because the server set not only allows custom policies to be defined for each deployment based on the deployment-setting specific parameters, but also allows these policies to be resolved based on dynamically changeable parameters for each specific deployment.

For each set of related machines, the server set in some embodiments stores the defined API-authorization policies, and collected parameters needed to resolve these policies, in a single hierarchical storage structure (such as a namespace) that can be accessed as a single runtime storage construct. The server set in some embodiments includes several modules for maintaining the policy and parameters in this runtime storage structure up to date. For instance, as mentioned above, the server set in some embodiments has one or more data-source adapters that receive and/or collect policy-resolving parameters for storage in the runtime hierarchical storage structure.

The server set in some embodiments identifies updates to parameters for evaluating the policies and stores these updates in this storage structure along with the authorization policies. In some embodiments, the runtime storage structure (e.g., the namespace) stores the policy for authorizing each API call as one or more lines of opcode (as one or more opcode expressions/statements). Each such policy is referred to as policy opcode in the discussion below. Also, policy operands in the discussion below refer to the parameters that are needed to resolve the policy opcodes for the API calls. The single storage structure stores such policy operands along with the policy opcodes. Policy operands can also accompany the API calls, or the API-authorization requests that are generated in response to such API calls.

In some embodiments, the server set distributes, through local controllers, the defined policies to policy-enforcing local agents that execute near the applications that process the API calls. Different embodiments place the local controllers and local agents in different positions with respect to their associated applications, as further described below. In some embodiments, the server set distributes different sets of policies to different local agents based on the policies that are relevant to the API-authorization processing for the applications associated with those agents.

Some embodiments provide a set of local controllers on a set of host computers that reduce the volume of data that is communicated between the server set and the set of host computers. The local controller executing on a particular host computer, in some embodiments, receives a portion of the namespace including only the policies (e.g., opcode) that are relevant to the API-authorization processing for the applications executing on the different host computer. The local controller analyzes the received policies (e.g., policy opcodes) and identifies the parameters (e.g. operands) needed for API-authorization processing (e.g., evaluating the policy opcode upon receiving a particular API request) by the local agent. In some embodiments, the local controller performs this analysis for each updated set of policies (e.g., policy opcodes).

Based on the parameters (or parameter values) identified as being required for the API-authorization processing, the local controller requests the identified parameters from a local data source. In some embodiments, the local source is a network controller that maintains a single storage structure (e.g., namespace) storing parameters (e.g., policy operands) for resources of the network. In some embodiments, the policy operands are stored in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively, or conjunctively, in some embodiments, the policy operands are expressed in other formats, e.g., binary format, etc. In some embodiments, the request is a set of calls to an API exposed by the network controller for parameters relating to a corresponding set of resources (or parameter values) necessary for API-authorization processing by the local agent. The request, in some embodiments, initiates a connection over which updates to the set of resources are sent to the local controller (e.g., in a push, or long-pull operation).

The local controller then receives the requested parameter values (relating to identified resources and parameters) from the local data source. Once the required parameter values are received by the local controller, the local controller provides the operands to the local agent for API-authorization processing. In some embodiments, the local controller provides only relevant data to the local agent, while in other embodiments, the set (or sets) of data provided by the local data source are provided in their entirety to the local agent. Similarly, as the local controller receives updates to the required parameters from the local data source (e.g., as a result of initiating the long-pull operation), the local controller provides the parameters to the local agent. In different embodiments, the local controller provides (1) the entire update from the local data source, (2) the relevant portion of the update from the local data source, (3) only the updated information from the local data source, and (4) only the updated relevant data from the local data source. In some embodiments, the local controllers also provide updated parameters to the server set to update the parameters stored by the server set.

From an associated application, a local agent receives API-authorization requests to determine whether API calls received by the application are authorized. In response to such a request, the local agent uses one or more parameters associated with the API call to identify a policy stored in its local policy storage to evaluate whether the API call should be authorized. To evaluate this policy, the agent might also retrieve one or more parameters from the local policy storage.

The local agent then uses the received or retrieved parameters to evaluate the retrieved API-authorization policy in order to determine whether the API call should be approved or rejected. Based on this evaluation, the local agent then sends a reply to the application that sent the API-authorization request, to specify whether the API call should be approved or rejected. In some embodiments, the applications send the API-authorization requests as RPC (Remote Procedure Call) messages, and the local agents send their replies to these requests as RPC reply messages.

In other embodiments, the applications send their API-authorization requests to the local agents through other mechanisms (such as other IPC (inter-process communication) messages) that initiate above the network stack. Also, in some embodiments, an API-authorization request does not come to the local agent from the application to which the API call is directed. For instance, in some embodiments, a first application intercepts an API call intended for a second application, and sends a request (e.g., through RPC, IPC, etc.) to authorize this API call to the local agent. When the local agent authorizes this request, the first application then passes the API call to the second application, while discarding this call when the local agent rejects this call. In some embodiments, the first application not only intercepts API calls to obtain authorization for these calls, but also intercepts these calls to first have them authenticated by a separate authentication service.

In some embodiments, the local agents are used to authorize API calls for both application domain logic (also called core logic or business logic) and application infrastructure logic. In other embodiments, the local agents are used to authorize API calls for application infrastructure logic but not application domain logic. Applications typically include application domain logic and application infrastructure logic. Application domain logic captures the domain rules for creating, storing, and manipulating data relating to the core functions of the application. For instance, in banking, domain logic captures the logic to calculate the monthly interests for bank accounts, prepare and calculate a mortgage offer (involving complex formulas using credit scores and other information available), or simply move funds between two accounts. In banking, domain logic would also be responsible for preparing the web page contents as customers access their bank accounts over the web.

Application infrastructure logic provides support functions that allow the application domain logic to run, and to run reliably and scalably. Examples of such support functions include integration functions with other applications (various protocol implementations), configuration management (logic might have configuration options), monitor and alert functions (to detect when the domain logic is down), schedule and thread management facilities (to run several logic instances is parallel for improved scalability), etc. While these functions are critical, they are not typically a concern of the application domain logic. Hence, decoupling API authorization for infrastructure logic simplifies the application code and allows the application's code to focus on the matters relevant to the application's core functions.

FIG. 1 illustrates a policy enforcement system 100 of some embodiments of the invention. As shown, this system includes a remote policy server set 105, several host computers 110, a first set of applications 115 executing on the host computers 110, several local agents 120 executing on the host computers 110, several local controllers 140 executing on the host computers 110, and a second set of applications 125 executing on the same host computers 110 or other devices or computers 130. The various computers and devices of the system 100 communicatively connect to each other through a network 180, which can include one or more local area networks, wide area networks, wireless networks, a network of networks (e.g., Internet), etc.

The host computers 110 in some embodiments operate in one or more datacenters. In some embodiments, the server set 105 includes one or more servers that operate in the same datacenter as the host computers 110, while in other embodiments the server set operates in a different datacenter than one or more of the host computers. The server set 105 acts as a logically centralized resource for defining, storing, distributing and enforcing policies for authorizing API calls to the first set of applications 115 that execute sets of associated machines (e.g., VMs, containers, etc.) that execute on the host computers 110. In some embodiments, each set of associated machines is associated with one entity (e.g., belongs to a tenant in a multi-tenant datacenter or to one division of a corporation in a corporate datacenter). Accordingly, the server set can be used to define, store, distribute and enforce different sets of policies for authorizing API-calls for the set of applications 115 that belong to different entities (e.g., different tenants) in one or more datacenters.

In some embodiments, some of these applications execute on virtual machines (VMs) or containers on the host computers, while other applications execute over the operating systems of the host computers. Also, in some embodiments, some of the API calls to a set of associated applications 115 come from other applications in the same set, while other API calls to the application set come from other applications (e.g., applications 125). The second set of applications 125 execute on host computers or devices inside or outside of the server set's datacenter(s) for which the server set does not enforce policies.

To define and store policies, the server set 105 in some embodiments receives and stores definitions of several authorization policies for a number of API calls to a set of associated applications. In some embodiments, the server set can receive the policies through a web-based user interface (e.g., a web browser) or some other interface (e.g., an API interface that supports receiving policies from other applications). The server set in some embodiments allows these policies to be custom defined in terms of different sets of parameters for the different sets of applications that are used in the different deployment settings in which the server set is employed (e.g., for different tenants in a multi-tenant datacenter or different departments or divisions of a multi-department or multi-division entity).

Through one or more interfaces (e.g., web-based interfaces or other interfaces), the server set 105 in some embodiments receives parameters for evaluating the policies. For one or more policy operand data sources 132 (e.g., from tenant LDAP directories, etc.) in the datacenter(s), the server set in some embodiments has one or more adapters that collect parameters from these data sources and store these parameters in order to evaluate the authorization policies to assess whether API calls should be authorized. The server set also allows such parameters to be entered through a web-based user interface.

For each set of related applications or machines (e.g., for each tenant in a multi-tenant datacenter), the server set in some embodiments stores the defined authorization policies and collected parameters in a single hierarchical storage structure 135. In some embodiments, the hierarchical storage structure allows each particular policy and a set of collected parameters associated with the particular policy to be retrieved by providing a location identifier (e.g., a path) that identifies a location in the hierarchical storage structure that stores the particular policy. In some embodiments, this location also stores the set of collected parameters for the particular policy. In other embodiments, this location either stores the set of collected parameters for the particular policy, or stores one or more location-identifiers for one or more locations in the hierarchical storage structure at which the set of collected parameters is previously stored in the structure. The hierarchical storage structure 135 in some embodiments is a namespace that stores the policies and the parameters for resolving these policies for the set of related machines.

In some embodiments, each authorization policy is defined by policy opcode in the namespace, while the parameter set for this authorization policy is defined as policy operands that are associated with the policy's opcode and that are stored in the namespace. The policy opcodes in some embodiments are written in a declarative language. Also, in some embodiments, the policy operands are written in a language-independent, structured format, such as JSON (JavaScript Object Notation) format or YAML (initially, "Yet Another Markup Language" and later, YAML Ain't Markup Language). Typically, such formats (e.g., JSON, YAML, etc.) are human readable. Alternatively or conjunctively, in some embodiments, the policy operands are expressed in other formats, e.g., binary format, etc.

The server set 105 in some embodiments identifies updates to one or more parameter sets (e.g., to one or more operands) for one or more one policies (e.g., policy opcodes), and stores these updates in the namespace. The server set in different embodiments employs different techniques for updating the policy operands. For instance, in some embodiments, the data source adapters of the server set identify operand updates by retrieving the updates from the data source 132 of the operands through data pull operations and/or by receiving the updates from these data source 132 through data push operations.

In some embodiments, the server set distributes the defined policies to local controllers 140 which will, in turn, provide the defined policies to local agents 120 that enforce these API-authorization policies for the applications 115. The local controllers 140 analyze the defined policies to identify parameters needed for API-authorization processing and then collect the identified parameters from a local data source. The local controllers 140 provide the collected parameters to the local agents. The local agents 120 store the distributed policies and parameters in their local policy/parameter store 150. In some of the embodiments that store the policies and parameters in a namespace, the server set distributes different portions of the namespace to different host computers based on the policies that are relevant to the API-authorization processing for the first set of applications 115 executing on the different host computers. The different portions that are distributed to the different host computers can be overlapping in some embodiments.

For instance, to a first computer 110a, the server set 105 distributes a first portion of the namespace that comprises policies relevant for processing API calls to a set of applications executing on the first computer, while distributing a second portion of the namespace that comprises policies relevant for processing API calls to a set of applications executing on the second computer 110b, with the first and second namespace portions differing in that at least one policy of the first portion is not in the second portion. These two namespaces can either have no policies in common, or have one or more policies in common. Each local agent 120 stores its local portion of the namespace that it receives from the server set 105 in its local policy/parameter store 150.

In some embodiments, the server set 105 uses a push model to distribute the policy (e.g., the relevant namespace portions) to each local controller 140. In other embodiments, the server set uses a pull model to distribute the policy. For instance, in these embodiments, once a local agent initializes, it queries the server set, through the local controller 140 (e.g., using the local controller 140 as a proxy), for policies and parameters relevant to it. The local controller 140, in these embodiments, queries the server set for the policies and responds to the query regarding the parameters. In these embodiments, the local agent also periodically polls the server set (e.g., through a local controller) to determine whether policies or parameters that the local agent previously received have been updated on the server set, and thereby need to be copied on the local agent's portion of the namespace. When such updates exist, the local agent retrieves them from the server set or receives them as part of its querying poll (e.g., through the local controller 140).

The local agent 120 executing on a host computer 110 receives requests to determine whether API calls received by one or more applications 115 executing on the host computer are authorized. The local agent in some embodiments receives each request to authorize an API call to an application from an authorization module of that application. In some embodiments, the authorization module of an application sends its API-authorization requests to the local agent through an RPC (Remote Procedure Call) message that is forwarded to the local agent by a network communication stack (e.g., the network stack executing on the application's host computer, the application's VM, or the application's container). In other embodiments, the authorization module sends its API-authorization requests to the local agent through other mechanisms (such as other IPC (inter-process communication) messages) that again, initiate above the network stack.

In response to such a request, the local agent 120 uses one or more parameters associated with the API call to identify a policy (e.g., policy opcode) stored in its local policy storage (e.g., stored in its local namespace) to evaluate in order to determine whether the API call should be authorized. The received API-authorization request contains one or more parameters associated with the API call (e.g., one or more parameters that identify the API call, its type and/or other metadata about the API call). In some embodiments, at least one parameter in the request is received by the application in the API call.

For instance, in some embodiments, the application receives the API call as part of the payload of one or more data messages (e.g., data packets) that the application receives, and at least one parameter in the first parameter set is a parameter that is part of the payload of the received data message(s). One or more modules (i.e., processes) are typically used to extract this payload for processing. For example, a layer 4 security process (e.g., a transport layer security (TLS) process) might have to decrypt one or more packet payloads in order to obtain the API call and its parameters in plaintext format (as opposed to the cipher text format in which they are received).

To evaluate the identified policy for the API call, the agent might also retrieve one or more parameters (e.g., operands) from the local policy storage (e.g., from its copy of the namespace). The local agent then uses the received or retrieved parameters to evaluate the retrieved API-authorization policy in order to determine whether the API call should be approved or rejected. For instance, in some embodiments, the retrieved policy opcode includes one or more rules that specify one or more conditions for approving or rejecting the API calls. The agent resolves these conditions based on the received or retrieved parameter(s) associated with the API call (e.g., the agent determines that one or more received or retrieved parameters match a condition specified by the policy opcode for rejecting an API call).

Based on this evaluation, the local agent then sends a reply to the application that sent the API-authorization request, to specify whether the API call should be approved or rejected. In some embodiments, the local agent sends its reply to the API-authorization request as an RPC reply message. When the API call is approved, the particular application then performs the operation associated with the API call, and if necessary, returns an output to the source of the API call (i.e., to the module that sent the API call) to the particular application. On the other hand, when the API call is rejected, the particular application sends the message to the source of the API call to reject the call, or simply discards this call without providing a response to the source of the API call.

In some embodiments, the local controllers 140 and the local agents 120 operate in the same failure domain as the machines on which the applications 115 execute. For instance, when an application executes on a virtual machine (VM) or container, the local controller and local agent, in some embodiments, execute on the same VM or container as the application. In other embodiments, the local controller and local agent do not execute on the same VM or container as their associated application, but executes on the same host computer as the application's VM or container. In yet other embodiments, a local agent executes on a same VM or container as the application and a local controller executes on the same host computer as the application's VM or container.

In some embodiments, each local agent 120 is associated with just one application 115 that executes on the same computer, same VM, or same container as the local agent. In other embodiments, one local agent 120 can be shared by multiple applications 115 that execute on the same VM, container, or host computer as the agent. However, in a multi-tenant datacenter, some embodiments do not allow local agents to be shared by applications executing on different tenant computers, VMs, or containers. Other embodiments, on the other hand, allow one local agent to be used by different applications of different tenants.

Similarly, each local controller 140 is associated with just one local agent 120 that executes on the same computer, same VM, or same container as the local controller. In other embodiments, one local controller 140 can be shared by multiple local agents that execute on the same VM, container, or host computer as the agent. However, in a multi-tenant datacenter, some embodiments do not allow local controllers to be shared by local agents executing on different tenant computers, VMs, or containers. Other embodiments, on the other hand, allow one local controller to be used by different local agents of different tenants.

Some embodiments have the local agents 120 operate within the same failure domain as the applications (e.g., micro service applications) in order to ensure that the policy functionality remains highly available and responsive at all times. Having local agents authorize API calls is very useful for micro-service applications as it provides a mechanism to implement complex API-authorization policies without adding to the micro-service applications the functional complexity needed to process rich API-authorization policies. This approach is also useful as it extracts the API-authorization processing from the application's code base, and therefore makes this processing easier to change dynamically over time. It also allows API-authorization processing for a large number of applications in a datacenter to be controlled in a logically centralized way through the server set.

Similarly, some embodiments have local controllers 140 operate within the same failure domain as the local agents 120 to ensure that the policies and parameters (e.g., policy opcodes and operands) provided to the local agents 120 are kept up to date as updates are received by the local controllers. The local controllers 140, in some embodiments, communicate directly with a local data source (e.g., a network controller controlling the resources of each tenant) to receive updates to parameters relevant to the local agents 120 and to provide the updates to the local agents as they are received. In some embodiments, the local controllers 140, filter the received updated parameters to isolate only those that (1) are relevant to the policies enforced by the local agent and (2) have been updated since the last update (e.g., updating only a changed parameter if an update has been sent based on a change to a resource parameter set in which only a single parameter has been changed).

As mentioned above, the server set 105 in some embodiments distributes policies to local controllers 140 which, in turn, provide the policies to local agents 120 so that they can evaluate API-authorization requests locally. Conjunctively or alternatively, the server set 105 in some embodiments also processes API-authorization requests from some or all of the applications 115. For instance, in some embodiments, it might not be feasible or desirable to perform the API-authorization on the same computer or failure domain as the application, e.g., the operating system restricts the type of agents installed, or the API-processing application executes on devices with limited computational resources (e.g., IoT (Internet of Things) devices). Also, in some embodiments, the response time for the API-authorization decision is not as crucial as the requested operations can be gradually rejected, or a limited access to the application can be provided until the API calls are authorized.

Accordingly, in some embodiments, an API-authorization module of an application executing on a computer sends an API-authorization request (e.g., as an RPC message) to a local agent 120 on the same computer, and this local agent 120 forwards this request (e.g., as another RPC message) to the server set 105 (e.g., through local controller 140 which acts as a proxy for the server set 105). In other embodiments, the API-authorization module of the application sends the API-authorization request (e.g., as an RPC message) directly to the server set 105.

The received API-authorization request contains a first parameter set associated with the API call. As before, the first parameter set includes at least one parameter that identifies the API call, its type and/or other metadata about the API call, and can include one parameter that was received as part of the API call. After receiving the API-authorization request, the server set 105 then uses one or more parameters in the first parameter set to retrieve a policy (e.g., policy opcode) related to the API call from its policy/data storage 135 (e.g., from its namespace for the set of associated machines to which the application belongs). To evaluate this policy, the server set might also retrieve one or more parameters from its policy storage 135 that are relevant for assessing the retrieved policy (e.g., retrieve policy operands from its namespace for the set of associated machines to which the application belongs). These retrieved set of parameters serve as a second set of parameters associated with the API call.

The server set 105 then uses the received or retrieved parameters to evaluate the retrieved API-authorization policy in order to determine whether the API call should be approved or rejected. For example, in some embodiments, the server set resolves one or more conditions specified in the retrieved policy opcode based on one or more received or retrieved parameters (e.g., determines that one or more received or retrieved parameters match a condition specified by the policy opcode for rejecting an API call). Based on this evaluation, the server set 105 then sends a reply (e.g., a RPC reply message) to the local agent 120 (e.g., through the local controller 140) or the application's authorization module to specify whether the API call should be approved or rejected. When this response is sent to the local agent 120, this agent then relays this message (e.g., as an RPC reply message) to the application's API-authorization module.

As mentioned above, the local policy and data storage 150 and the server policy and data storage 135 of some embodiments are hierarchical namespaces that store both policy opcode and policy operands that are needed for resolving the policy opcodes (i.e., both the code and the data on which the code operates). In some embodiments, the namespace is a document database in that it has no tables and instead is laid out as a single hierarchical document. This document forms one global namespace that holds all the data and policies. For instance, the following namespace structure is a hierarchical layout of a policy-and-document database that stores three JSON data documents and two policies:

/a/b/doc_1.json
/a/b/doc_2.json
/c/d/doc_3.json
/d/policy_A
/e/f/policy_B

In this example, there are two JSON documents at namespace location '/a/b' and a third JSON document at '/c/d', while the two policies are saved at '/d' and '/e/f'.

As a namespace merges the data and policies into one global hierarchical layout, database clients can access a nested portion of the namespace simply by requesting data by its fully qualified name. Moreover, to access a portion of policy operand document 1, the client can simply request the data with name:

/a/b/doc_1/some_portion.

The same applies to policies: the namespace evaluates the policies on-the-fly when client accesses the namespace. That is, client can simply access the results of a "policy evaluation" by referring the policy and its relevant portion. For instance, a client can request /e/f/policy_B/some_computed_result, which would make title database take the source of code of the policy B, compute the policy using any data necessary that the policy may need underneath and then pass the requested portion of the policy results back to the client.

Figure 2:
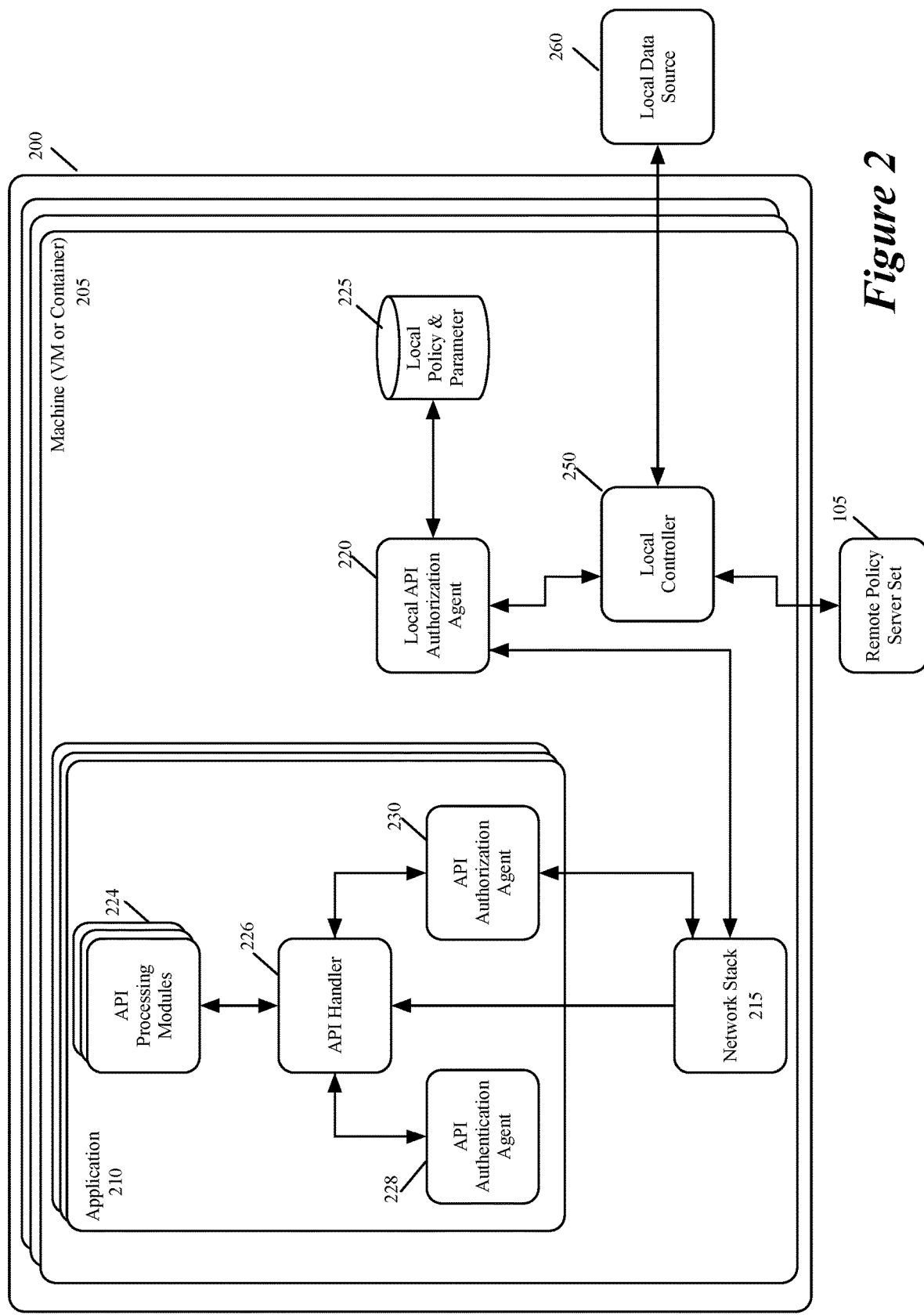
FIG. 2 illustrates the host-side software architecture of the API-authorization system of some embodiments.

FIG. 2 illustrates the host-side software architecture of the API-authorization system 100 of some embodiments. Specifically, it illustrates a host computer 200 on which multiple machines 205 (e.g., multiple VMs or containers) execute. On each machine 205, multiple applications 210 can execute to process API calls from other modules on the host computer 200 or on other host computers or devices in the same datacenter or outside of the datacenter.

In addition to these applications, each machine 205 also has a network stack 215 and a local API-authorizing agent 220. The network stack 215 is a software communication stack (e.g., TCP/IP stack) that implements a network communication protocol suite to allow the applications and processes of the machine 205 to communicate with each other, and with applications and processes executing outside of this machine (e.g., on the same host computer 200 or on other computers or devices). When the machine 205 is a container, its network stack is the network stack of the VM or operating system on which the container executes. Also, the network stack of a machine often connects with another module (e.g., a software switch) on the host computer, which, in turn, interfaces with a physical network interface card (NIC) of the host computer.

One set of communications that the network stack 215 facilitates is the communication between an application's API-authorizing agent 230 on an application and the local API-authorizing agent 220. As further described above and below, the network stack passes RPC data messages between the application agent 230 and the local agent 220. The local agent 220 enforces API-authorization policies for the applications that execute on the machine 205. Specifically, from the application API-authorizing agents 230 of the machine 205, the local API-authorizing agent 220 receives API-authorization requests for different APIs that the applications 210 receive.

For each such request, the local agent 220 retrieves the API-authorization policy associated with the request (i.e., associated with API call to which the request pertains) from its local policy and parameter storage 225. The local agent 220 retrieves this policy by using one or more parameters that are associated with the API call and that were received with the API call or the API-authorization request. From the policy/parameter storage, the local agent 220 can also retrieve one or more parameters for evaluating this policy.

The local storage 225 stores policies and parameters that, in some embodiments, the server set 105 and local controller 250 have previously provided to the local agent 220. In other embodiments (not shown), the local storage 225 can be directly accessed by local agent 220 to populate policies and parameters received from the server 105 and local data source 260. In some embodiments, this storage also stores parameters that the local agent separately receives from a local parameter integrator described in more detail in U.S. patent application Ser. No. 16/050,123, filed on Jul. 31, 2018 which is hereby incorporated by reference. This integrator allows an entity in the datacenter (e.g., a tenant or a department) to separately provide some or all of the parameters for evaluating the API-authorization policies. For instance, this integrator allows the entity to export highly confidential parameters into an API-authorization policy enforcement node without providing these parameters to the server set 105.

The local agent 220 then evaluates the retrieved policy based on parameter(s) received with the API-authorization request, or retrieved from the local storage 225. Based on its evaluation, the local agent then determines whether the API call should be approved or rejected. The local agent then sends the application API-authorizing agent 230 that sent the API-authorization request, a reply to specify whether the API call should be approved or rejected. In some embodiments, the API-authorizing agent 230 sends the API-authorization requests as RPC (Remote Procedure Call) messages, and the local agents send their replies to these requests as RPC reply messages.

In the example illustrated in FIG. 2, each machine 205 has its own local API-authorizing agent 220. Each such local agent 220 on a machine 205 can process API-authorization requests from one or more applications 210 executing on the machine. Having the local agent 220 operate on the same machine as its associated application 210 is beneficial, as in this way, both these components operate in the same failure domain, which improves the agent's availability and its speed of processing API-authorization requests. However, in other embodiments, the applications on multiple machines on a host computer share the same local agent. For instance, in some embodiments, the local agent operates as a service VM or container on a host computer, and applications on multiple VMs and/or containers use this agent to have their API calls authorized. Instead of having the local agent operate as a service VM or container in the user space, other embodiments have the local agent operate as another type of process on the host computer that is accessed by multiple applications on multiple VMs and/or containers on a host computer.

In the example illustrated in FIG. 2, each machine 205 also has its own local controller 250. Each such local controller 250 on a machine 205 can process communications from the local agent on the machine 205 to the server set 105. Having the local controller 250 operate on the same machine as its associated local agent 220 is beneficial as in this way, both these components operate in the same failure domain, which improves the local controller's availability and its speed of processing updates and providing them to the local agent 220 (for storage in the local storage 225). However, in other embodiments, the local agents on multiple machines on a host computer share the same local controller. For example, a local controller, in some embodiments, implements multiple local controller instances or maintains multiple namespace interfaces for multiple local agents as described in relation to FIG. 4. Alternatively, if no data is pushed from a local controller and the local agents initiate data pulls, the local controller that responds to each call for a data pull with the requested data can be shared by multiple local agents. In yet other embodiments, a single local controller is provided for a single local agent associated with a set of applications executing on multiple machines. For instance, in some embodiments, the local agent operates as a service VM or container on a host computer, and a local controller operates as an additional service VM or container. Instead of having the local agent and local controller operate as a service VM or container in the user space, other embodiments have the local controller operate as another type of process on the host computer that is accessed by local agents on a host computer.

As shown in FIG. 2, each application has an API handler 226, an API-authentication agent 228, and one or more API processing modules 224, in addition to the API-authorizing agent 230. An API processing module 224 is a module (e.g., an object) that performs an operation based on API call to it. The API authentication agent 228 is the module that authenticates the identity of the API-call's source (e.g., validates the access credentials associated with the API call). When the API call is authenticated, the API authorization agent 230 determines whether the API call is authorized (i.e., whether the operation associated with the API call should be performed). The API handler 226 is the module that initiates the authentication operation and authorization operation for each API call. In some embodiments, the API handler is implemented by authentication and/or authorization code of the API processing modules (e.g., this handler is implemented in some embodiments by authentication and authorization code within each API processing object of an application). A detailed description of the operations of the components of the application 210 can be found in U.S. patent application Ser. No. 16/050,123, filed Jul. 31, 2018.

Figure 3:
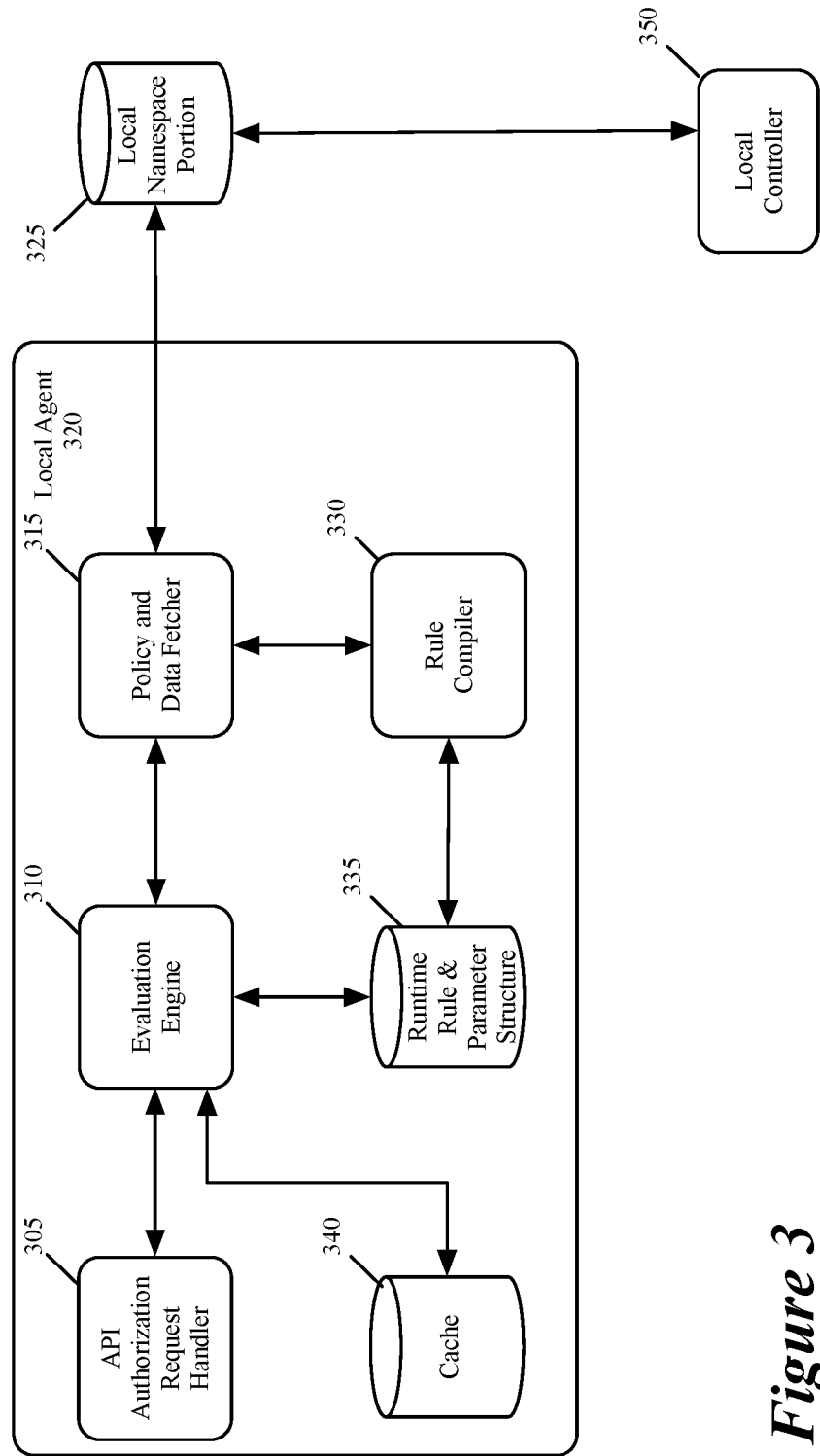
FIG. 3 illustrates a more-detailed view of a local agent of some embodiments.

FIG. 3 illustrates a more-detailed view of a local agent 320 of some embodiments. In this example, the local agent 320 uses a local namespace portion 325 as the local policy and data storage 225. This namespace contains both (1) policy opcodes to evaluate API calls to determine whether they should be authorized, and (2) operands to use to evaluate and resolve the opcodes. In some embodiments, the namespace portion 325 contains the policy opcodes and operands needed for the API calls that are received by one or more applications on the agent's host that use the local agent. In other embodiments, the local agent has a different namespace portion for different applications.

The local agent 320, in some embodiments, has a namespace interface (not shown) that receives and stores the namespace portion and updates to all or part of this portion from the remote policy server set 105 (e.g., through local controller 350). This interface, in some embodiments, also receives policy operands from local parameter integrator (not shown), which can be used in some deployments to store policy operands in the namespace that are not provided to the server set 105 (e.g., to maintain the confidentiality of such policy operands). Upon the initialization of the local agent 320, the namespace interface in some embodiments initially queries the server set (e.g., through local controller 350) to obtain the namespace(s) for the applications that will use the local agent. Also, in some embodiments, the namespace interface of the local agent periodically polls the server set to determine whether any policy or operand in its namespace has been added, deleted or modified, and if so, the namespace interface updates its local namespace portion 325 to reflect this change (e.g., to download any new and/or modified policy and/or operand and store the downloaded policy and/or operand in the namespace portion). In some embodiments, these functions are performed at a namespace interface of a local controller 450 depicted in FIG. 4.

The local agent 320 also includes a request handler 305, evaluation engine 310, policy and data fetcher 315, and rule compiler 330. The operations of these modules is described in U.S. patent application Ser. No. 16/050,123, filed on Jul. 31, 2018, which illustrates a process that the local agent 320 performs when it receives a request to authorize an API call from an API-authorizing agent 230 of an application 210 that executes on the same host as the local agent 320.

Figure 4:
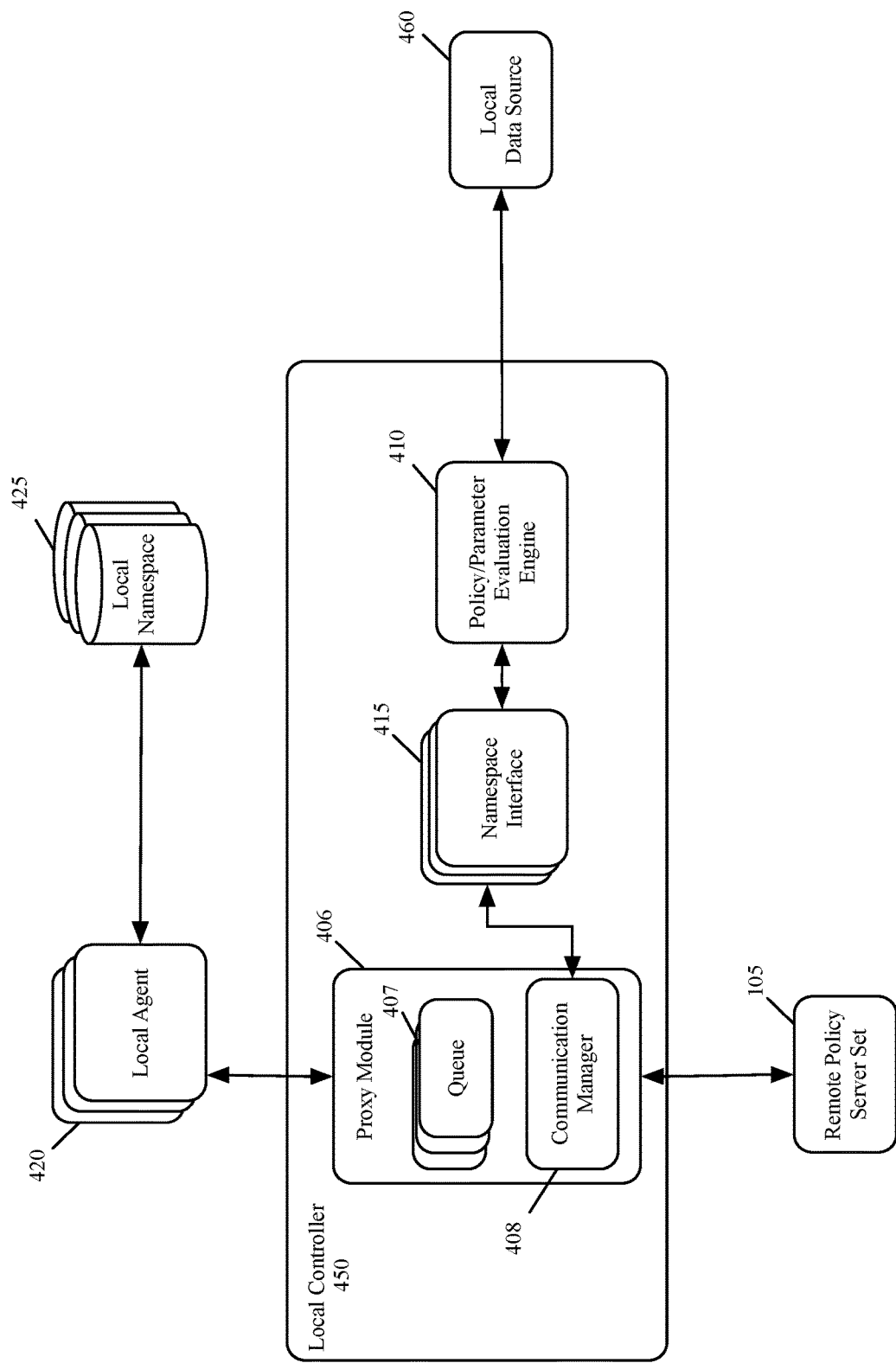
FIG. 4 illustrates a more-detailed view of a local controller of some embodiments.

FIG. 4 illustrates a more-detailed view of a local controller 450 of some embodiments. In this example, the local controller 450 acts as a proxy between server set 105 and a set of local agents 420 which use a corresponding set of local namespace portions 425 as the local policy and data storage 225. This namespace contains both (1) policy opcodes to evaluate API calls to determine whether they should be authorized, and (2) operands to use to evaluate and resolve the opcodes. In some embodiments, the namespace portions 425 contains the policy opcodes and operands needed for the API calls that are received by one or more applications on the agent's host that use the local agent. In some embodiments, the set of local agents 420 is a set of local agents for a set of different tenants or applications and each local agent has a different namespace portion for each different tenant or application. In other embodiments, each local agent 420 would have a corresponding local controller 450 serving as a proxy for server set 105.

The local controller 450 has a proxy module 406 that acts as a proxy between the local agents 420 and the server set 105. In some embodiments, the proxy module 406 includes a communication manager 408 that interacts with the remote policy server set 105 and the namespace interface 415. The proxy module 406 includes a set of queues 407 that can queue requests and other communications between local agents 420 and server set 105. In some embodiments, the queues are used, in the event that the remote server set 105 or a local agent 420 is unavailable, to store communications from the local agents 420 or the remote server set until the remote server set 105 or local agent 420 becomes available. For example, the set of local agents 420, in some embodiments, reports authorization decisions made by the local agent to the remote server set 105 through local controller 450. The remote server set 105 stores the reported decisions, and related policies and parameters stored by the remote server set 105, to provide insight to a system administrator or to identify when the system is not working as expected (i.e., API calls that should not be allowed have been allowed or vice versa). Additionally, the set of queues 407, in some embodiments is used to store communications regarding sets of authorization policies (e.g. initial sets of policies or policy updates) until policy analysis and parameter retrieval is complete.

The local controller 450 has a set of namespace interfaces 415 that, in some embodiments receives and stores the namespace portions for different applications or different tenants and updates to all or part of these portions from the remote policy server set 105 and local data source 460. The local controller 450, in some embodiments, also receives policy operands from a local parameter integrator, which, as mentioned above, can be used in some deployments to store policy operands in the namespace that are not provided to the server set 105 (e.g., to maintain the confidentiality of such policy operands). In some embodiments, data received by a local controller 450 from a local data source (e.g., based on a long-pull connection initiated by the local controller calling a watch API for data regarding a set of resources) is asynchronously pushed to the local controller 420 using a local-agent API. The pushed data received at the local agent 420, in some embodiments, is merged into the local namespace 425 of the local agent 420.

Upon the initialization of the local agent 420, a namespace interface of the local agent 420, in some embodiments, initially queries the server set (e.g. through the local controller 450) to obtain the namespace(s) for the applications that will use the local agent. Also, in some embodiments, the namespace interface of the local agent 420 periodically polls the local controller 450, in its capacity as a proxy for the server set 105, to determine whether any policy or operand in its namespace has been added, deleted or modified, and if so, the namespace interface of the local agent 420 updates its local namespace portion 425 to reflect this change (e.g., to download any new and/or modified policy and/or operand and store the downloaded policy and/or operand in the namespace portion).

In addition to the set of namespace interfaces 415, the local controller 450 includes a policy/parameter evaluation engine 410 that analyzes the authorization policies received from the server set 105 to determine a set of parameters (or parameter values) necessary for API-authorization processing by the local agents in the set of local agents 420. The evaluation engine 410, in the depicted embodiment, analyzes authorization policies stored in the set of namespace interfaces 415. In other embodiments, the set of authorization policies are analyzed before being stored in the set of namespace interfaces 415. The analysis of the policies performed before storing the policies in a particular namespace interface in the set of namespace interfaces 415, includes any, or all, of identifying policies that are relevant to specific namespace interfaces for (1) different applications, (2) different tenants, or (3) different local agents to populate each namespace interface with only the authorization policies (e.g., policy opcodes) required by the different applications, tenants, or local agents. Examples of the analysis of policy and parameter sets performed by the evaluation engine 410 will be discussed in relation to FIGS. 5-7.

Figure 5:
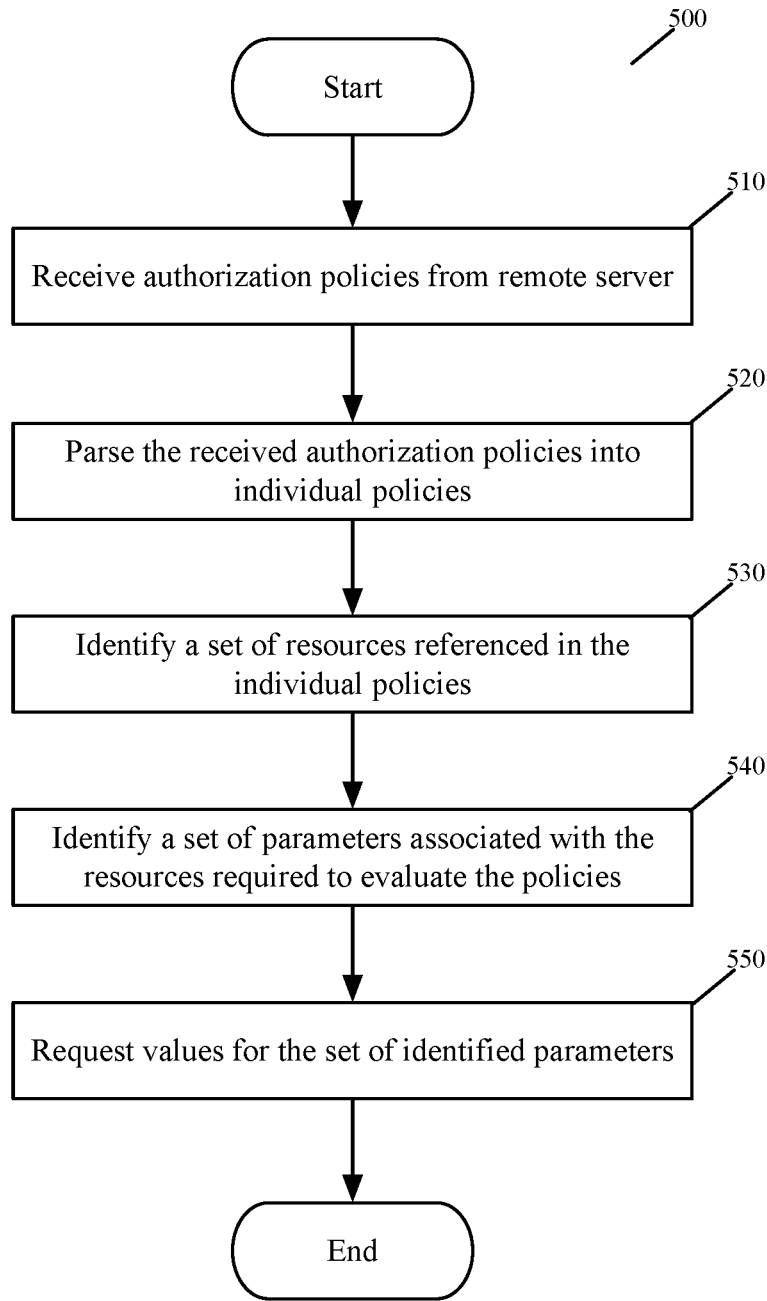
FIG. 5 conceptually illustrates a process performed by a local controller to analyze a set of authorization policies received from the server set in order to retrieve the necessary parameters from the local data source.

FIG. 5 conceptually illustrates a process 500 performed by a local controller 450 (or the evaluation engine 410) to analyze a set of authorization policies (e.g. policy opcodes) received from the server set 105 in order to retrieve the necessary parameters from the local data source 460. The process 500 begins (at 510) by receiving a set of authorization policies (e.g., policy opcodes) from the server set. In some embodiments, the set of policies is received based on a change to a local agent (e.g., an initialization or a change to the applications for which the local agent provides API-authorization processing). In some embodiments, the set of authorization policies is sent based on a change to a set of policies previously sent to the local controller/local agent. Additional operations of process 500 will be described in relation to an example of a received policy illustrated in FIG. 6.

FIG. 6 illustrates a sample authorization policy (e.g., policy opcode) that is received from a remote server set 105 by the local controller (e.g., local controller 450). FIG. 6 illustrates a simple policy 610 ("enforce[decision]") that is specified to ensure that no two ingresses are configured to use a same hostname. The code for the policy 610 includes a reference 612 to (e.g., calls) a rule 615 defined in a library (e.g., a policy library). The rule 615 depends on an ingress parameter 620 (i.e., data regarding ingresses stored at "data.kubernetes.resources.ingresses"). Thus, as will be described below, in order to execute the policy 610, the local agent requires data regarding parameter 620.

After receiving (at 510), the set of authorization policies, the process 500 parses (at 520) the set of policies. In some embodiments, parsing the set of policies includes identifying individual policies in the set of policies. For example, in FIG. 6, policy 610 ("enforce[decision]") includes a reference 612 to (e.g., calls) a rule 615 ("ingress host conflict [reason]"). In parsing this policy, the process 500 identifies that the policy 610 calls the rule 615. Parsing the set of policies, in some embodiments, further identifies rules called by the individual policies. In some embodiments, parsing the set of policies further identifies all the rules in a hierarchical structure of the policy.

In some embodiments using a shared local controller for multiple tenants, parsing (at 520) the received set of policies also includes identifying the policies applicable to different tenants. In some embodiments, identifying policies for different tenants is based on a tenant identifier associated with a received set of policies. In other embodiments using a shared local controller for multiple local agents (e.g., of multiple applications of a single tenant or for multiple tenants), parsing (at 520) the received set of policies includes identifying the policies used by each different local agent and populating a namespace for each local agent with the relevant policies. In some such embodiments, after policy data is parsed and associated local agents are identified, the policy data is provided to the associated local agent. In other such embodiments, the policy data is stored in a local namespace of the local controller until the required parameters have been retrieved a will be discussed in relation to FIG. 7.

Once the policies are parsed (at 520) the process 500 identifies (at 530) a set of resources that are used in evaluating the rules called by the policy. For example, in identifying the set of resources in FIG. 6, the rule 615 ("ingress host conflict[reason]") is identified as depending on an ingress resource parameter (e.g., an existing ingress parameter not conflicting with a requested ingress parameter). In some embodiments, there may be multiple layers of rule calls that all need to be parsed to identify a complete set of rules called and parameters necessary to evaluate the identified rules.

Once the policies have been parsed (at 520), the process identifies (at 530) a set of resources referenced in the policies (or rules) identified by the parsing. For example, in the example of FIG. 6, the process 500 identifies that the policy 610 calls the rule 615, which in turn depends on an ingress resource 620 (i.e., "data.kubernetes.resources.ingresses"). The identified resource for each set of policies (or each policy in a set of policies), in some embodiments, is associated with the set of policies as part of the identification operation to avoid having to identify the required resources in subsequent operations of the local controller. In some embodiments, resources provided by multiple local data sources are identified (e.g., a first resource associated with a first cloud provider and a second resource associated with a local deployment). Additional resources including pods, containers, etc. can be identified in parsing the policies as will be understood by one of ordinary skill in the art.

Once the set of resources have been identified (at 530), the process 500 identifies (at 540) a set of parameters associated with the resources used in evaluating the policies. In some embodiments, the parameters are a specific subset of information relating to the identified parameters. For example, in FIG. 6 the ingress resource 620 is identified as being used to evaluate the policy 610 and a set of parameters 625 (i.e., "[ns] [name]") associated with the resource is identified as being required to evaluate the policies.

Once the set of parameters associated with the resources have been identified (at 540), the process 500 then requests (at 550) data regarding values of the set of identified parameters. In some embodiments, the process 500 requests the data through a set of API calls to a local data source. For example, in a Kubernetes deployment, a local agent executing on a node in a cluster of nodes makes a call to a watch API exposed by a kube-apiserver component of a Kubernetes control plane implemented by a set of machines in the cluster. In the example of the policy depicted in FIG. 6, the local controller calls the watch API to initiate a long-pull connection for at least data regarding resource "data.kubernetes.resources.ingresses" 620 to resolve the policy "enforce [decision]" 610. Alternatively, the local controller requests parameter values for the specific parameters associated with the resource (e.g., ingress[ns][name]). The set of API calls, in some embodiments, include a set of arguments to identify the requested resources. The set of API calls, in some embodiments, includes separate API calls for each resource, while in other embodiments, the API call accepts multiple arguments specifying multiple resources for which to request data. In some embodiments, the set of API calls is a set of API calls that initiate a long-pull to be notified of changes to the resource (e.g., a request to be notified upon changes to parameters associated with the identified resource). Additionally, in some embodiments, the set of requests for parameter data (e.g., parameter values) include multiple requests to multiple local data sources that maintain different required parameter data. One of ordinary skill in the art will understand that the requests may take any form (e.g., API call, database query, etc.).

The process 500, in some embodiments, is performed each time a set of policies is received at a local controller. As mentioned above, sets of policies may be received upon a change to the set of applications related to the local controller (e.g., applications executing in a same cluster, or on a same host computer, machine, or container) or upon a change to the set of policies (e.g., a change received from an administrator).

The policy/parameter evaluation engine 410 is also responsible, in some embodiments, for requesting the parameter values for the parameters identified in process 500 from local data source 460. Local data source 460, in some embodiments, is a network controller (or set of network controllers) that are responsible for controlling the resources of the network (e.g., spinning up new pods, clusters, application instances, etc.) and maintaining a current state of the network resources. In some embodiments local data source 460 represents a set of multiple local data sources including at least one local parameter integrator as described in U.S. patent application Ser. No. 16/050,123, filed on Jul. 31, 2018. The evaluation engine 410, in some embodiments, also analyzes the parameter data sets (e.g., sets of parameter values) to determine which data is relevant to each local agent it supports. In other embodiments, sets of received parameter data are analyzed before being stored in the set of namespace interfaces 415. The analysis performed before storing the parameters in a particular namespace interface in the set of namespace interfaces 415, includes any, or all, of identifying parameters that are relevant to specific namespace interfaces for (1) different applications, (2) different tenants, or (3) different local agents to populate each namespace interface with only the parameters (e.g., operands) required by the different applications, tenants, or local agents. Examples of the analysis of parameter sets performed by the evaluation engine 410 will be discussed in relation to FIG. 7.

Figure 7:
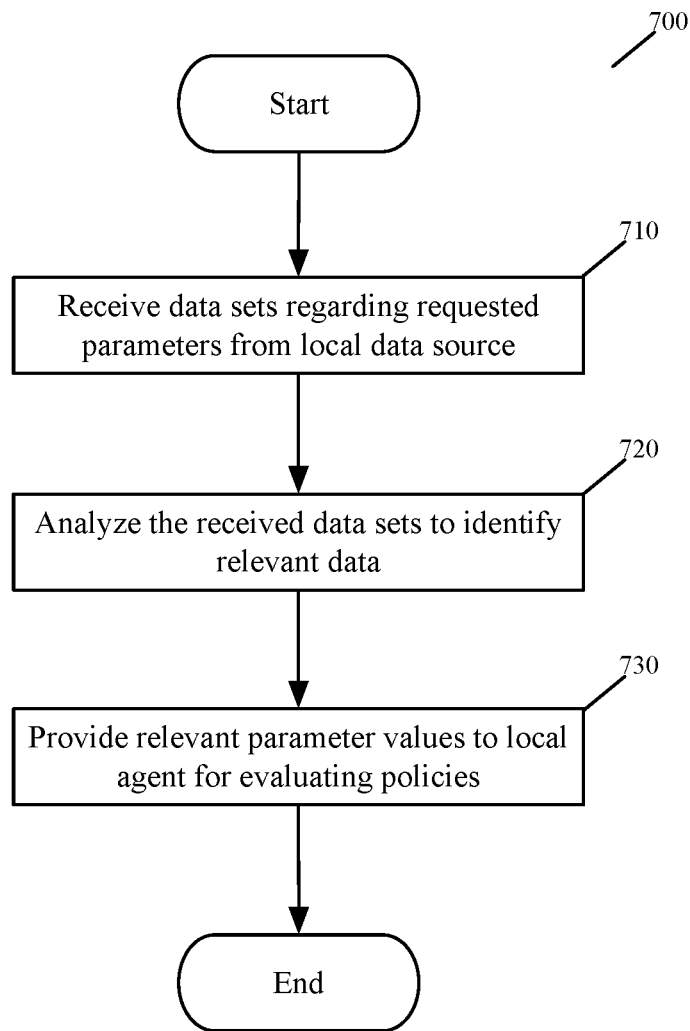
FIG. 7 conceptually illustrates a process for receiving and analyzing data regarding the parameter values that were requested as discussed in relation to FIG. 5.

FIG. 7 conceptually illustrates a process 700 for receiving and analyzing data regarding the set of parameters (e.g., parameter values) that were requested as discussed in relation to FIG. 5. Process 700 is performed by the local controller to provide local agents with the retrieved parameter values (e.g. operands) necessary to evaluate a set of API authorization policies (e.g., policy opcode) applied at the local agent. Process 700 begins (at 710) by receiving, from the local data source (e.g., a network controller) at least one set of parameter values that was the subject of a request. The data set, in some embodiments, includes all data regarding the requested parameter. In some embodiments, the received parameter values also include a set of data indicating changes to the parameter values from the last time the set of data regarding the parameter was sent. In other embodiments, a first set of parameter values is sent with all the data regarding the requested parameter, with subsequent sets of parameter values including information regarding changes to the parameter values.

Once the parameter values are received (at 710), the process analyzes the parameter values to identify (at 720) relevant data for at least one local agent. In some embodiments, identifying (at 720) the relevant data for a local agent includes: (1) identifying policies associated with the local agent (e.g., using policies stored in a namespace of the local controller associated with the local agent), (2) identifying the parameters relevant to the policies (which, in some embodiments, includes looking up a set of parameters stored as part of process 500), and (3) identifying updates or changes to the parameters (e.g., the parameter values). Identifying updates or changes to the parameter values, in some embodiments, includes comparing the received parameter values to stored parameter values. In other embodiments, the changes or updates are identified (at 720) by data in the parameter values specifying the changes. In some embodiments, after identifying the changes to the parameter values, the parameter values stored by the local controller are updated and the entire set of parameter values is identified as the relevant data for local agents requiring the parameter values for the updated parameter. In some embodiments, the entire namespace associated with the local agent including the updated parameter values is identified as the relevant data.

The identified relevant data is then provided (at 730) to the local agents. In some embodiments, providing (at 730) the relevant data to a particular local agent includes populating a namespace interface (e.g., namespace interface 415 of FIG. 4) that is associated with the local agent with the identified relevant data and using the namespace interface to communicate the relevant data to the associated local agent or directly to a local namespace associated with the local agent. In embodiments identifying the updated parameter values as the relevant data, the local controller sends the complete set of updated parameter values to the local agent that requires data for that parameter. In embodiments identifying the entire namespace associated with the local agent as the relevant data, providing (at 730) includes sending the entire namespace to the local agent. In some embodiments, the relevant data includes any API-authorization policies that have not been sent to the local agents (e.g., while parameters were being identified and parameter values were being retrieved and analyzed).

The policy data and parameter values, in some embodiments, are stored by the local controller in a shared memory space that is accessible by at least one local agent. In embodiments using more than one local agent (e.g., a multi-tenant environment or an embodiment using a different local agent for each of multiple containers, machines, or applications executing on a host computer), providing the relevant data includes sending separate parameter values to each local agent. A single set of parameter values, in some embodiments, is relevant to multiple local agents and receiving the updated parameter values results in providing updated parameter values (e.g., just changes to parameter values, all updated parameter values, or entire updated namespaces) to each of the multiple local agents to which it is relevant. In some embodiments, the local controller maintains a single namespace associated with multiple local agents and sends portions of the namespace to each local agent based on identifying (at 720) the relevant data for the local agent. The different portions for different local agents, in some embodiments, differ in that at least one policy and at least one parameter set of the first portion is not in the second portion. The different namespaces portions can have no policies or parameters in common, or they can have one or more policies and parameters in common.

One of ordinary skill in the art will understand that the process 700, in some embodiments, is performed for each set of parameter values received from any of multiple local data sources. Additionally, while the above description assumes a single namespace data structure, other embodiments use different data storages to store policy and parameter data. These different data storages, in some embodiments, are used to optimize the policy data storage for analysis and to optimize the parameter data storage for frequent updates and searchability.

In some embodiments, the local agent caches the decisions that it reaches in processing a rule structure for a particular set of parameters. In some embodiments, the decisions are reported to a remote server set along with information identifying a set of parameters on which the decision was based. The remote server set, in some embodiments, stores the information for later analysis (e.g., debugging or reporting operations). In some embodiments, the local controller provides updated parameter sets to the remote policy server set to maintain up-to-date parameter information at the remote policy server set. In order to reduce overly-redundant parameter updates from multiple local controllers receiving the same updates from a local data source, some embodiments, assign particular sets of local controllers to report changes to particular parameters for which they receive updates.

In other embodiments, the remote policy server set also implements a policy evaluation engine similar to evaluation engine 410 to determine a set of parameters required for evaluating all the policies stored in the remote policy server set. The remote policy server set, in such embodiments, uses this data to register for notifications of changes to parameters for those parameters as described in relation to the local controller (e.g., by calling an API of a local data source to initiate a long-pull operation). By performing its own analysis, the remote policy server set can reduce redundant information being sent over the network and the processing required to process the same data from multiple local controllers.

As mentioned above, the local agents in some embodiments are used to authorize API calls for both application domain logic and application infrastructure logic, while in other embodiments, the local agents are used to authorize API calls for application infrastructure logic but not application domain logic. Also, as mentioned above, decoupling API authorization for infrastructure logic simplifies the application code and allows the application's code to focus on the matters relevant to the application's core functions. This is especially the case because while infrastructure functions are critical, they are not typically a concern of the application domain logic.

For instance, in banking, it is the infrastructure part of the application that is responsible for maintaining micro-services' connections to an account database holding the actual account data (there could many of those), providing the necessary HTTP facilities to allow the customers' browsers to retrieve their account contents (customers would expect SSL, for instance), as well as providing connectivity between micro-services (modern applications include several micro-services which then together form the application).

Both core logic and infrastructure parts require authorization in their operations. However, the type of authorization implemented is different: core logic implements authorization decisions over the core data and operations, while the infrastructure parts implement authorization decisions for the functionality they provide.

This implies that core logic is likely to implement authorization decisions that are fundamentally tied to the logic being implemented. For instance, in banking, there are restrictions about the mortgage offer approvals, between which account transfers can be moved without further security inspection (bank internal transfers are less risky compared to transfers to other banks), or between which kind of accounts fund transfers are allowed to begin with (a savings account could have restrictions for the number of transfers done per month). Even the size of the transfer itself is likely to affect the authorization decision.

Similarly, in healthcare, the core logic is the one that is responsible for health care data and operations over it: creation and filling prescription is likely to involve several authorization steps that are tied to the processing of the prescription data. For instance, heavy painkillers are likely to have more strict authorization logic in place to allow the creation of the prescription to begin with.

On the contrary, authorization within the infrastructure parts of the application and micro-service revolve around the infrastructure level entities. The authorization decisions are about whether a micro-service can talk to another, which micro-service API calls can invoke, or whether a micro-service can open a connection to a particular database instance and read a particular table. For business logic, these are low-level details that are typically invisible to the end user.

Application infrastructure level authorization is also relevant and related to the managing of the application and micro-service as whole. For example, a micro-service instance might run inside a VM and the type of a micro-service is likely to affect who (and when) can access the VM. For instance, it is common to block all access by default and allow access only as-needed basis. In that case only the people actively resolving an incident related to application are allowed to access the VM and hence the application deployment. While this does not concern the application instance itself (a process running a micro-service instance is not responsible for managing the VM the process runs within), these authorization decisions can be considered to be part of application infrastructure authorization.

As mentioned above, the remote policy server set 105 in some embodiments collects and updates parameters for resolving policies dynamically and in a deployment specific manner (i.e., in a manner that can be context specific for each set of associated machines for which the server set is deployed). This allows policies to be resolved based on conditions and dynamically changing parameters that are specific to each deployment. As further described below, the server set allows the values for policy operands to dynamically change because it allows local agents to receive (through push operations or pull operations) such changes for the policy operands in the respective namespaces of the local agents.

The use of a local controller as described above in relation to FIGS. 2-7 has several advantages. First, as parameter data (e.g., parameter values) is likely to change more rapidly than authorization policies, if the remote server set sends an updated namespace (which can include on the order of 100 MB of data) upon every change to the parameter data, the parameter updates would waste a significant amount of the network resources. By handling parameter data updates locally, the frequency of receiving large amounts of data from the remote server set is reduced and network resources are conserved for providing the services of the different applications operating on the network. Second, by using the local agents to collect parameter data, the parameter data no longer has to be sent form the remote server set, further reducing the network traffic from the remote server set. Third, using a local controller as a proxy between the remote server set and the local agent allows the local controller to queue communications from the local agents to the remote servers in the case of a failed connection to the remote server set.

The local API-authorization request processing described in U.S. patent application Ser. No. 16/050,123, filed on Jul. 31, 2018 also has several advantages. First, by packing the relevant portion of the namespace with both policies and data parameters for resolving these policies, and then providing this portion to a local agent executing on the same host computer as the applications that need their API calls authorized, this API-authorization request processing is fast and highly available. No remote device has to be accessed to process these requests.

This approach can also cache the optimized rule data structure for the API-authorization policy opcode associated with an API call after this structure is created for assessing whether the API call should be allowed. This cached rule data structure can be subsequently use for processing requests associated with the same API call. In this manner, the cached structure eliminates the need for the rule compiler to recreate the optimized rule structure while the local agent processes the authorization request with the subsequent iterations of the same API call.

As mentioned above, the local API-authorization request processing of some embodiments also caches decision. Whenever decisions are cached, the system has to address cache revocation. Revoking cache decisions when policies are enforced by a central set of servers is complicated. A centralized approach might use rather long caching timeouts to maximize the efficiency of its decision caching. But this would then require some mechanism to explicitly detect which cached decisions have to be revoked when a policy or data changes. Otherwise the local cache could store stale decisions for long periods of time, before they timeout and replaced with new ones matching the updated policy and data.

To figure out the decisions to revoke from cache, the application in the centralized approach would have to keep track of policies and data used in the decisions it receives from the centralized location—and then the centralized decision maker would have to inform the application if any of these changes. This is convoluted at best: to support revocation, the interface between application and centralized decision maker has to deal with policy and data information that they would not otherwise even need. After all, the authorization decisions are executed centrally, outside of the application, yet, somehow applications would have to understand the data and policies used in those decisions so that they could cache those decisions. As a result, the interface between the application and central location would now include information about data, policies and decisions.

On the other hand, in the local API-authorization request processing described in U.S. patent application Ser. No. 16/050,123, filed on Jul. 31, 2018, the interface between the application and decision is just about namespace (i.e., about the policies and data). The entire namespace bundle comes with a single version that the application can use to check if the central location has any updates for this portion of the namespace. This results in much simpler and reliable interface between the application and central location.

The software architecture of the server set 105 of some embodiments of the invention is described in U.S. patent application Ser. No. 16/050,123, filed on Jul. 31, 2018. The policy defining and distribution system described in U.S. patent application Ser. No. 16/050,123, filed on Jul. 31, 2018, has several advantages. It imports remote management API state (e.g., as JSON objects) in the document database, which allows the system to effectively construct a logical, centralized view of the datacenter state. This combined with versioning allows the system to provide versioned snapshots of the entire datacenter state, if needed. For example, in some embodiments, the local agents 220 identify the namespace versions that they use to process the API-authorization requests and provide this version information to the server set to store in decision logs. Subsequently, through a browser interface and decision logs, a user can perform browser-based searches to extract the exact state of the policies and parameters at the time a decision was made. This state information includes the version data. The version data can also be used to search the decision logs. These capabilities are highly useful for debugging the API-authorization system. These search and debug operations are also supported in some embodiments through API interfaces that support API calls from automated processes that collect and process log data.

Also, the system's overall process of extracting remote management APIs, disseminates relevant pieces of this data together with the relevant policy code for the agents. This near real time dissemination of management state is highly beneficial that current techniques cannot duplicate. Current systems integrate with the necessary remote management APIs on their own, which creates $N^2$ integrations, whereas the system 100 can do the integrations once, which results in N integrations.

The system 100 also uses a declarative policy language for document-oriented, structured data. Also, as mentioned above, the system 100 in some embodiments decouples policy (authorization) logic from the applications to an agent nearby. In a traditional authorization solution (e.g., using LDAP), the policy logic is part of the application source code and application directly retrieves the relevant data from the LDAP, applying its logic on the data retrieved.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
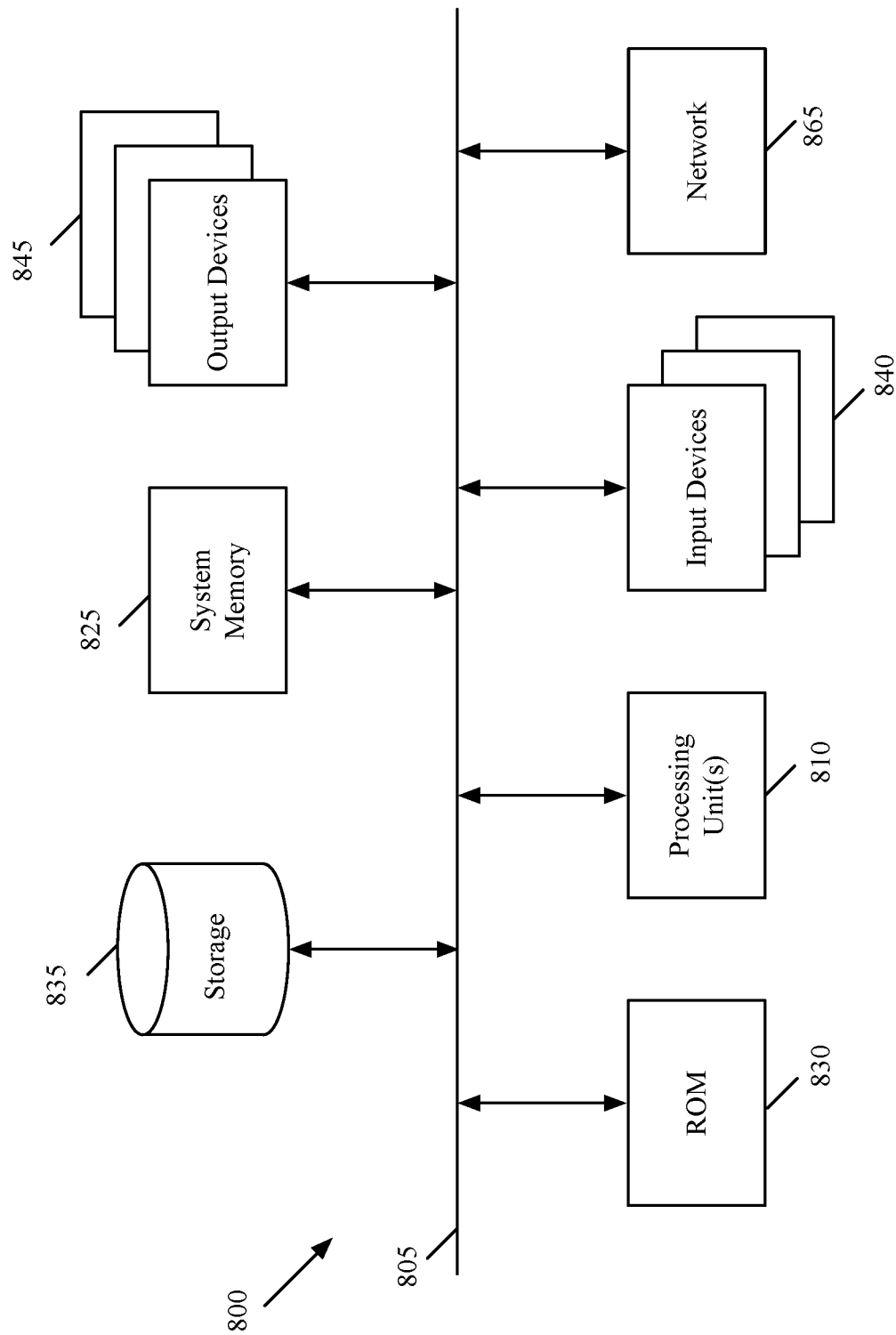
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. The electronic system 800 is also the control plane modules of the load balancer of some embodiments. As shown, the electronic system includes various types of computer readable media and interfaces for various other types of computer readable media. Specifically, the electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory (ROM) 830, the system memory 825, and the permanent storage device 835. From these various memory units, the processing unit(s) 810 retrieve instructions to execute and data to process in order to execute the processes of the invention. The processing unit(s) may be a single processor or a multi-core processor in different embodiments.

The ROM 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

While micro-services were mentioned as one type of applications that could get the benefit of the API-authorization processes and systems of some embodiments, one of ordinary skill will realize that these processes and systems of some embodiments are also used to authorize API calls for other types of applications, such as SSH (secure shell) applications or other types of applications. Also, in several embodiments described above, the API-authorization enforcement system enforces API-authorization policies for different sets of related machines in one or more datacenters. In other embodiments, the API-authorization enforcement system enforces API-authorization policies just based on the applications or types of applications executing on the computers. For instance, a datacenter can employ the API-authorization enforcement system of some embodiments for one or more application or application types of all of its tenants or users. In these embodiments, the policies are policies that are deployed based on application identity or type, and not based on association between related sets of machines executing in the datacenter.

Also, several of the above-described embodiments have the local agents and/or the server set evaluate the policies based on the operands to determine whether to allow or reject API calls. In other embodiments, the local agents or the server set configure the applications 115 that receive the API calls, or other agents/processes in the datacenter authorize or reject API calls based on configurations that the local agents and/or server set push to these applications and/or other agents/processes. For instance, each time a local namespace portion is updated, the local agent or the server set in an AWS datacenter identifies the API calls affected by the update, determines whether these API calls should now be allowed or rejected, and pushes to the AWS IAM (Identity and Access Management) system new configuration data to ensure that these API calls are appropriately allowed or rejected.

In some embodiments, some or all of the local agent functionality is embedded in a plugin that is installed in the API-processing application. In this manner, some or all of the above-described operations of the local agents are performed by plugins installed in the API-processing applications in some embodiments. In other embodiments, instead of implementing these operations with plugins, some embodiments have the local agent and/or server set update API rule configuration file of an API-processing application whenever the local namespace associated with the application is modified and this modification affects the application's processing of one or more API calls. Therefore, one of ordinary skill in the art would understand that the invention is not to be limited by the foregoing illustrative details, but rather is to be defined by the appended claims.

We claim:

1. A method for authorizing API (Application Programming Interface) requests on a computer executing an application that receives the API requests, the method comprising:
    providing a local agent executing on the computer to receive the API requests from the application to which the API requests are directed, in order to authorize the API requests based on policies and parameters; and
    providing a local controller that (1) executes on the computer, (2) analyzes the policies applicable to the application to identify parameters used in evaluating the policies, (3) requests values for the identified parameters from a local data source, and (4) provides the identified parameter values to the local agent upon receiving the identified parameter values from the local data source,
    wherein when the local agent determines that a first API request is authorized based on the parameters received from the local controller, the local agent notifies the application executing on the computer that the first API request is authorized, which, in turn, causes the application to process the first API request,
    wherein when the local agent determines that a second API request is not authorized based on the parameters received from the local controller, the local agent notifies the application that the second API request is not authorized, which, in turn, causes the application to reject the second API request.

2. The method of claim 1, wherein the policies are policy opcodes and the parameter values are operands.

3. The method of claim 1, wherein the policies are received from a remote server storing policies and parameter values for a plurality of applications executing on a plurality of computers.

4. The method of claim 3, wherein the local controller receives the policies in response to a request for the policies sent from the local controller.

5. The method of claim 4, wherein:
    the request for the policies is a forwarded request sent from the local agent, and
    the local controller acts as a proxy for the local agent (1) to communicate the request to the remote server and (2) to communicate the response to the local agent.

6. The method of claim 5, wherein the local controller acts as a proxy for communications to the remote server regarding decisions made by the local agent.

7. The method of claim 6, wherein, when the remote server is unavailable, the local controller queues the communications to the remote server.

8. The method of claim 4, wherein the policies received at the local controller comprise only policies applicable to the applications executing on the computer.

9. The method of claim 8, wherein the request for the policies only comprises a request for the policies applicable to the applications executing on the computer.

10. The method of claim 8, wherein the application is a first application and the local agent is a first local agent, and a second application executing on the computer receives API requests that require authorization, the method further comprising:
providing a second local agent executing on the computer to receive the API requests from the second application to which the API requests are directed, in order to authorize the API requests made to the second application based on policies and parameters,
wherein the local controller identifies first and second sets of policies in the received policies that are applied by the first and second local agents respectively, and provides the first set of policies to the first local agent and the second set of policies to the second local agent.

11. The method of claim 10, wherein analyzing the policies applicable to the application to identify parameters used in evaluating the policies further comprises analyzing the first and second set of policies to identify first and second sets of parameter values needed for evaluating the first and second set of policies respectively, and
wherein providing the identified parameter values to the local agent comprises providing the first set of parameter values to the first local agent and providing the second set of parameter values to the second local agent.

12. The method of claim 1, wherein the identified parameters comprise parameters relating to network resources.

13. The method of claim 1, wherein the request to the local data source comprises an API call comprising a set of arguments that are specified based on the identified parameters.

14. The method of claim 13, wherein the request to the local data source comprises a call to an API that provides a notification regarding updates to the identified parameters.

15. The method of claim 14, wherein the notification comprises a human-readable document that is provided to the local controller from the network controller.

16. The method of claim 15, wherein the human readable document is in one of a JSON (JavaScript Object Notation) format or YAML (Yet Another Markup Language) format.

17. The method of claim 14, wherein providing the identified parameter values to the local agent upon receiving the parameter values from the local data source further comprises providing updated parameter values each time the local controller receives a notification regarding an update to a parameter value of the identified parameters.

18. The method of claim 17, wherein the updated parameter values comprise an updated subset of parameter values of the identified parameters.

19. The method of claim 1, wherein:
the policies are a first set of policies; and
the local controller:
receives a second set of policies applicable to the application that comprises at least one change from the first set of policies;
based on an analysis of the second set of policies, identifies the same set of parameters used in evaluating the second set of policies as was needed for evaluating the first set of policies; and
provides the second set of policies to the local agent to use to authorize the API requests.

20. The method of claim 1, wherein:
the policies are a first set of policies; and
the local controller:
receives a second set of policies applicable to the application that comprises at least one change from the first set of policies;
based on an analysis of the second set of policies, identifies at least one additional parameter used in evaluating the second set of policies than was used in evaluating the first set of policies;
requests values for the at least one additional identified parameter from the local data source; and
provides the second set of policies and the at least one additional identified parameter value to the local agent to use to authorize the API requests upon receiving the at least one identified parameter value from the local data source.

* * * * *